United States Patent
Adefris et al.

(10) Patent No.: US 6,354,929 B1
(45) Date of Patent: Mar. 12, 2002

(54) ABRASIVE ARTICLE AND METHOD OF GRINDING GLASS

(75) Inventors: Negus B. Adefris, Burnsville; Louis R. Carpentier, Eagan; Todd J. Christianson, Oakdale; Brian D. Goers, Minneapolis; Ashu N. Mujumdar, Woodbury; Gary M. Palmgren, Lake Elmo; Soon C. Park, Woodbury, all of MN (US)

(73) Assignee: 3M Innovative Properties Company, St. Paul, MI (US)

( * ) Notice: Subject to any disclaimer, the term of this patent is extended or adjusted under 35 U.S.C. 154(b) by 0 days.

(21) Appl. No.: 09/250,821

(22) Filed: Feb. 17, 1999

Related U.S. Application Data

(60) Provisional application No. 60/099,850, filed on Sep. 11, 1998, provisional application No. 60/090,220, filed on Jun. 22, 1998, and provisional application No. 60/075,149, filed on Feb. 19, 1998.

(51) Int. Cl.[7] .............................. B24B 7/22; B24D 3/28

(52) U.S. Cl. ......................... 451/527; 451/530; 51/298

(58) Field of Search ................... 51/298, 304; 451/527, 451/530, 539

(56) References Cited

U.S. PATENT DOCUMENTS

| 1,910,444 A | 5/1933 | Nicholson |
| 3,041,156 A | 6/1962 | Rowse et al. |
| 3,270,467 A | 9/1966 | Block et al. |

(List continued on next page.)

FOREIGN PATENT DOCUMENTS

| DE | 3330512 | 11/1984 |
| EP | 0 650 803 B1 | 5/1995 |
| GB | 1 327 653 | 8/1973 |
| GB | 2 043 501 | 10/1980 |
| WO | WO 95/00295 | 1/1995 |
| WO | WO 95/19242 | 7/1995 |
| WO | WO 96/33638 | 10/1996 |
| WO | WO 9705990 | 2/1997 |
| WO | WO 97/11484 | 3/1997 |
| WO | WO 97/1435 | 4/1997 |
| WO | WO 97/14535 | 4/1997 |
| WO | WO 9812021 | 3/1998 |

OTHER PUBLICATIONS

Burns, "Getting Started in DCPD RIM Molding", *Plastics Technology*, pp. 62–69, Mar. 1989.

Burns, "Micro–Rim'Replaces Injection Molding in Electronics Encapsulation", *Plastics Technology*, pp. 39–44, (1998).

"Engineering Polymers –Properties Guide: Thermoplastics and Polyurethanes", Brochure from the Polymers Division of Bayer Corporation, pp. 1–32 (1987).

(List continued on next page.)

*Primary Examiner*—Robert A. Rose
(74) *Attorney, Agent, or Firm*—Scott A. Bardell

(57) ABSTRACT

The present invention is a fixed abrasive article for grinding or polishing the surface of a glass workpiece. The abrasive article for grinding glass has abrasive composites containing a binder, an alkaline metal salt, and diamond abrasive particles or agglomerate particles comprising diamond particles, the composites integrally molded to a backing. The abrasive article for grinding glass is capable of removing between about 200 and 400 micrometers of glass using an RPP procedure having a polish time interval of between 10 and 15 seconds, generally about 12 seconds. The abrasive article for polishing glass comprises a backing containing fibers, and a plurality of abrasive composites integrally molded to the backing comprising an organic resin, ceria abrasive particles, and alkaline metal salt. The abrasive articles for polishing glass also provide an optimum rate of breakdown of the abrasive composites and improved adhesion between the abrasive composites and the backing.

20 Claims, 5 Drawing Sheets

U.S. PATENT DOCUMENTS

| | | | |
|---|---|---|---|
| 3,522,342 A | | 7/1970 | Nungesser et al. |
| 3,562,968 A | | 2/1971 | Johnson et al. |
| 3,667,170 A | | 6/1972 | MacKay, Jr. |
| 3,947,169 A | | 3/1976 | Butzke et al. |
| 4,311,489 A | | 1/1982 | Kressner |
| 4,314,827 A | | 2/1982 | Leitheiser et al. |
| 4,328,322 A | | 5/1982 | Baron |
| 4,364,746 A | * | 12/1982 | Bitzer et al. .................. 51/298 |
| 4,576,612 A | | 3/1986 | Shukla et al. |
| 4,609,581 A | | 9/1986 | Ott |
| 4,623,364 A | | 11/1986 | Cottringer et al. |
| 4,644,703 A | | 2/1987 | Kaczmarek et al. |
| 4,652,274 A | | 3/1987 | Boettcher et al. |
| 4,652,275 A | | 3/1987 | Bloecher et al. |
| 4,668,736 A | | 5/1987 | Robins et al. |
| 4,733,502 A | | 3/1988 | Braun |
| 4,733,920 A | | 3/1988 | Pannbacker |
| 4,735,632 A | | 4/1988 | Oxman et al. |
| 4,744,802 A | | 5/1988 | Schwabel |
| 4,751,138 A | | 6/1988 | Turney et al. |
| 4,770,671 A | | 9/1988 | Monroe et al. |
| 4,799,939 A | | 1/1989 | Bloecher et al. |
| 4,875,259 A | | 10/1989 | Appeldorn |
| 4,881,951 A | | 11/1989 | Wood et al. |
| 4,903,440 A | | 2/1990 | Morris et al. |
| 4,918,874 A | | 4/1990 | Tiefenbach, Jr. |
| 4,997,461 A | | 3/1991 | Markhoff-Matheny et al. |
| 5,009,675 A | | 4/1991 | Kunz et al. |
| 5,011,508 A | | 4/1991 | Wald et al. |
| 5,014,468 A | | 5/1991 | Ravipati et al. |
| 5,039,311 A | | 8/1991 | Bloecher |
| 5,042,991 A | | 8/1991 | Kunz et al. |
| 5,045,091 A | | 9/1991 | Abrahamson et al. |
| 5,077,870 A | | 1/1992 | Melbye et al. |
| 5,152,917 A | | 10/1992 | Pieper et al. |
| 5,164,348 A | | 11/1992 | Wood |
| 5,174,795 A | | 12/1992 | Wiand |
| 5,213,591 A | | 5/1993 | Celikkaya et al. |
| 5,232,470 A | | 8/1993 | Wiand |
| 5,233,719 A | | 8/1993 | Young et al. |
| 5,233,794 A | | 8/1993 | Kikutani et al. |
| 5,236,472 A | | 8/1993 | Kirk et al. |
| 5,254,194 A | | 10/1993 | Ott et al. |
| 5,256,170 A | | 10/1993 | Harmer et al. |
| 5,273,558 A | | 12/1993 | Nelson et al. |
| 5,304,223 A | | 4/1994 | Pieper et al. |
| 5,316,812 A | | 5/1994 | Stout et al. |
| 5,368,619 A | | 11/1994 | Culler |
| 5,400,458 A | | 3/1995 | Rambosek |
| 5,427,595 A | | 6/1995 | Pihl et al. |
| 5,435,816 A | | 7/1995 | Spurgeon et al. |
| 5,460,883 A | | 10/1995 | Barber, Jr. et al. |
| 5,505,747 A | | 4/1996 | Chesley et al. |
| 5,580,647 A | | 12/1996 | Larson et al. |
| 5,607,488 A | | 3/1997 | Wiand |
| D381,139 S | | 7/1997 | Johnson et al. |
| 5,679,067 A | | 10/1997 | Johnson et al. |
| 5,681,217 A | | 10/1997 | Hoopman et al. |
| 5,782,682 A | | 7/1998 | Han et al. |
| 5,849,052 A | | 12/1998 | Barber, Jr. |
| 5,903,951 A | | 5/1999 | Ionta et al. |
| 5,975,988 A | * | 11/1999 | Christianson ................ 451/28 |
| 6,155,910 A | * | 12/2000 | Lamphere et al. .......... 451/527 |

OTHER PUBLICATIONS

Evans, "New Equipment for Lower–Cost RIM", *Plastics Technolgy*, pp. 37–39, (1990).

Fujiwara et al., "Reactive Processing of Thermoset/Thermoplastics Blends: A Potential for Injection Molding", *Polymer Engineering and Science*, vol. 36, No. 11, pp. 1541–1546 (1996).

"Injection Molding –Bucher upgrades thermoset technology", *Plastics World*, pp. 24–24 (1989).

Kim et al., "Rubber Modified Epoxy Resin. III: Reaction Injection Molding Process", *Polymer Engineering and Science*, vol. 3, pp. 564–576 (1995).

McMahon, "An introduction to reaction injection molding", *Advanced Materials & Processes*, pp. 37–38 (1995).

Muller et al., "New Developments in Isocyanate–Based Casting Resins for the Electrical and Electronics Industry", reprinted from *Advances in Urethane Science and Technology*, vol. 12, pp. 166–207 ( undated).

Nguyen et al., "Processing of Polyurethane /Polyester Interpenetrating Polymer Networks by Reaction Injection Molding. Part III: Flow Reorientation Through Multiple Impingement", *Polymer Engineering and Science*, vol. 26, pp. 843–853 (1986).

Odinki, "Characterization of Fast–Cure Resins for Reaction Injection Molding", *Polymer Engineering and Science*, vol. 23, pp. 756–762 (1983).

Pannone et al., "Reaction Kinetics of a Polyurea Reaction Injection Molding System", *Polymer Engineering and Science*, vol. 28, pp. 660–669 (1988).

Schlotterbeck et al., "MATERIALS: Polyurea/Amide Elastomers–a New RIM Generation Debuts", *Plastics Engineering*, pp. 37–40 (1989).

Viola et al., "Isocyanate Trimerzation Kinetics and Heat Transfer in Structural Reaction Injection Molding", *Polymer Engineering and Science*, vol. 34, No. 15, pp. 1173–1186 (1994).

Watts, "Abrasive Monofilaments–Critical Factors that Affect Brush Tool Performance", Society of Manufacturing Engineers Technical Paper (1988).

Willkomm et al., "Properties and Phase Separation of Reaction Injection Molded and Solution Polymerized Polyureas as a Function of Hard Block Content", *Polymer Engineering and Science*, vol. 2, pp. 888–900 (1988).

* cited by examiner

ABRASIVE ARTICLE AND METHOD OF GRINDING GLASS

This application claims the benefit of U.S. Provisional Application No. 60/099,850, filed Sep. 11, 1998; U.S. Provisional Application No. 60/090,220, filed Jun. 22, 1998; and U.S. Provisional Application No. 60/075,149, filed Feb. 19, 1998.

FIELD OF THE INVENTION

The present invention pertains to an abrasive article for grinding and polishing glass and a method of using the same.

BACKGROUND OF THE INVENTION

Glass articles are extensively found in homes, offices, and factories in the form of lenses, prisms, mirrors, CRT screens, and other items. Many of these glass surfaces are used with optical components which require that the surface be optically clear and have no visible defects and/or imperfections. If present, defects, imperfections, and even minute scratches may inhibit the optical clarity of the glass article. In some instances, these defects, imperfections, and/or minute scratches may inhibit the ability to accurately see through the glass. Glass surfaces used with optical components must be essentially free of any defect, imperfection, and/or scratch.

Many glass surfaces are curved or contain a radius associated therewith. These radii and curves are generally generated in the glass forming process. However, as a result of the glass forming process, defects such as mold lines, rough surfaces, small points, and other small imperfections, may be present on the outer surface of the glass. These defects and/or imperfections, however small, tend to affect the optical clarity of the glass. Abrasive finishing processes have been widely used to remove such imperfections and/or defects. The abrasive finishing typically falls within three main processes: grinding, fining, and polishing.

Grinding steps perfect the desired curve or radius and removes any casting defects by rough grinding the glass surface with an abrasive tool. Typically this abrasive tool contains superabrasive particles such as a diamond, tungsten carbide, or cubic boron nitride. However, the abrasive tool in this rough grinding process will impart coarse scratches into the glass surface such that resulting glass surface is neither precise enough nor smooth enough to directly polish to an optically clear state. The objective of the grinding process is to remove large amounts of glass quickly and fairly accurately while leaving as fine of a scratch pattern as feasible. These scratches are then typically removed by further steps commonly known as "fining" and "polishing".

Glass finishing is typically done with a loose abrasive slurry. The loose abrasive slurry comprises a plurality of abrasive particles dispersed in a liquid medium such as water. The most common abrasive particles used for loose slurries are pumice, silicon carbide, aluminum oxide, and the like. The loose abrasive slurry may optionally contain other additives such as dispersants, lubricants, defoamers, and the like. In most instances, the loose abrasive slurry is pumped between the glass surface that is being finished and a lap pad, such that the loose abrasive slurry is present between the glass surface and the lap pad. The lap pad may be made from any material such as rubber, foam, polymeric material, metal, steel, and the like. Typically, both the glass workpiece and the lap pad will rotate relative to each other. This grinding process typically comprises one or more steps, with each step generating a progressively finer surface finish on the glass.

The roughness of a surface is typically due to scratches or a scratch pattern, which may or may not be visible to the naked eye. A scratch pattern may be defined as a series of peaks and valleys along the surface. Rtm and Ra are common measures of roughness used in the abrasives industry, however, the exact measuring procedure may vary with the type of equipment utilized in surface roughness evaluation.

Ra is defined as an average roughness height value of an arithmetic average of the departures of the surface roughness profile from a mean line on the surface. Measurements are taken at points both above and below the mean line on the surface within an assessment length set by the Rank Taylor Hobson instrument. Ra and Rtm (defined below) are measured with a profilometer probe, which is a 5 micrometer radius diamond tipped stylus and the results are recorded in micrometers ($\mu$m). These departure measurements are totaled and then divided by the number of measurements to arrive at an average value. Generally, the lower the Ra value, the smoother the finish.

Rt is defined as the maximum peak-to-valley height. Rtm is the average, measured over five consecutive assessment lengths, of the maximum peak-to-valley height in each assessment length. In general, the lower the Rtm value, the smoother the finish. A slight variation in the Ra and Rtm values may, but not necessarily, occur when the measurement on the same finished glass surface is performed on different brands of commercially available profilometers.

The final step of the overall finishing process is the polishing step which generates the smoother, optically clear surface on the glass article. In most instances, this polishing step is done with a loose abrasive slurry, since the loose slurry typically generates an optically clear surface that is essentially free of any defects, imperfections, and/or minute scratches. Typically, the loose abrasive slurry comprises ceria abrasive particles dispersed in water.

Although loose abrasive slurries are widely utilized in the fining and polishing steps to provide an optically clear surface finish on glass articles, loose abrasive slurries have many disadvantages associated with them. These disadvantages include the inconvenience of handling the required large volume of the slurry, the required agitation to prevent settling of the abrasive particles and to assure a uniform concentration of abrasive particles at the polishing interface, and the need for additional equipment to prepare, handle, and dispose of or recover and recycle the loose abrasive slurry. Additionally, the slurry itself must be periodically analyzed to assure its quality and dispersion stability which requires additional costly man hours. Furthermore, pump heads, valves, feed lines, grinding laps, and other parts of the slurry supply equipment which contact the loose abrasive slurry eventually show undesirable wear. Further, the steps which use the slurry are usually very untidy because the loose abrasive slurry, which is a viscous liquid, splatters easily and is difficult to contain.

Understandably, attempts have been made to replace the loose abrasive slurry finishing steps with lapping, coated, or fixed abrasive products. In general, a lapping abrasive comprises a backing having an abrasive coating comprising a plurality of abrasive particles dispersed in a binder. For example, U.S. Pat. Nos. 4,255,164; 4,576,612; 4,733,502; and European Patent Application No. 650,803 disclose various fixed abrasive articles and polishing processes. Other references that disclose fixed abrasive articles include U.S. Pat. Nos. 4,644,703; 4,773,920; and 5,014,468.

However, fixed abrasives have not completely replaced loose abrasive slurries. In some instances the fixed abrasives do not provide a surface, which is optically clear, and essentially free of defects, imperfections, and/or minute scratches. In other instances, the fixed abrasives require a longer time to polish the glass article, thereby making it more cost effective to use a loose abrasive slurry. Similarly in some instances, the life of a fixed abrasive is not sufficiently long to justify the higher cost associated with the fixed abrasive in comparison to loose abrasive slurries. Thus, in some instances, fixed abrasives are not as economically desirable as loose abrasive slurries.

What is desired by the glass industry is an abrasive article that does not exhibit the disadvantages associated with a loose abrasive slurry, but that is able to effectively and economically grind a glass surface in a reasonable time by providing fast stock removal over a short period of time.

BRIEF SUMMARY OF THE INVENTION

One aspect of the invention is directed to abrasive articles for grinding and polishing glass workpieces. The abrasive article for grinding glass includes a backing and at least one three-dimensional abrasive coating comprising diamond particles and a metal salt dispersed in an organic binder, the coating integrally bonded to the backing.

In another aspect, the abrasive article for grinding glass includes a backing and at least one three-dimensional abrasive coating, comprising abrasive agglomerates comprising diamond particles dispersed within a permanent binder, preferably a glass binder, the agglomerates being dispersed within an organic binder integrally bonded to the backing.

In another aspect, the invention provides an abrasive article for polishing glass workpieces comprising a backing comprising fibers and at least one three-dimensional abrasive coating integrally bonded to the backing, the coating comprising ceria particles, an organic binder, and a metal salt. The abrasive articles of the invention for polishing provide an optimum rate of breakdown of the abrasive composites and improved adhesion between the abrasive composites and the backing. The abrasive article for polishing glass preferably further comprises an additive for improving the polishing rate. Preferred additives include graphite and molybdenum disulfide.

It is preferred that the at least one three-dimensional abrasive coating includes a plurality of abrasive composites. The plurality of abrasive composites may be precisely shaped composites, irregularly shaped composites, or precisely shaped composites including a cylinder or any other post-shape having a flat top.

In one preferred abrasive article, the abrasive composites comprise epoxy binder and are integrally molded urethane backing. Acrylates and urethane acrylates may also be usable as a preferred material.

For grinding glass, it is preferred that the abrasive particles comprise diamond abrasive particles or diamond agglomerate particles. Optionally, the diamond particles may be blended with other non-diamond hard abrasive particles, soft inorganic abrasive particles, and mixtures thereof. For polishing glass, it is preferred that the abrasive particles comprise ceria particles.

It is preferred that the diamond abrasive particles are present in the abrasive composite in a weight percent between about 0.1% to 10%, preferably between about 2% to 4%. The preferred amount of ceria abrasive particles is up to 85% by weight.

In one embodiment of the invention, the abrasive article for grinding glass is capable of removing between 200 and 400 micrometers stock on a glass test blank to a final Ra of about 1.1 μm or less using an RPP procedure having a grinding time interval of between 10 and 15 seconds, generally about 12 seconds.

In another embodiment of the invention, the abrasive article for grinding glass is capable of removing 200 micrometers stock on a glass test blank to a final Ra of about 0.80 μm or less using an RPP procedure having a grinding time interval of between 10 and 15 seconds, generally about 12 seconds.

In yet another embodiment of the invention for grinding glass, the abrasive article containing agglomerates containing diamond particles is capable of removing 100 micrometers stock on a glass test blank to a final Ra of about 0.7 μm using an RPP procedure having a grinding time interval of between 10 and 15 seconds, generally about 12 seconds.

In yet another embodiment of the invention for polishing glass, the abrasive article containing ceria is capable of reducing surface roughness of Ra 0.07 μm to a surface roughness of about 0.009 μm using a polish time interval of about 45 seconds or less, preferably in about 30 seconds or less, more preferably about 20 seconds or less and even more preferably, about 15 seconds.

The RPP Test Procedure

The "RPP" procedure utilizes a "Buehler Ecomet 4" variable speed grinder-polisher on which is mounted a "Buehler Ecomet 2" power head, both of which are commercially available from Buehler Industries, Ltd. of Lake Bluff, Ill. The test is typically performed using the following conditions: motor speed set at 500 rpm with a force 60 lbs. (267 N), which provides an interface pressure of about 25.5 psi (about 180 kPa) over the surface area of the glass test blank. The interface pressure may be increased or decreased for testing under varied conditions.

Three flat circular glass test blanks are provided which have a 2.54 cm (1 inch) diameter and a thickness of approximately 1.0 cm, commercially available under the trade designation "CORNING #9061", commercially available from Corning Incorporated, Corning, N.Y. The glass material is placed into the power head of the grinder-polisher. The 12-inch (30.5 cm) aluminum platform of the grinder-polisher rotates counter clockwise while the power head, into which the glass test blank is secured, rotates clockwise at 35 rpm.

An abrasive article to be tested is die cut to a 20.3 cm (8 inch) diameter circle and is adhered with a pressure sensitive adhesive directly onto an extruded slab stock foam urethane backing pad which has a Shore A hardness of about 65 durometer. The urethane backing pad is attached to an extruded slab open cell, soft foam pad having a thickness of about 30 mm. This pad assembly is placed on the aluminum platform of the grinder/polisher. Tap water is sprayed onto the abrasive article at a flow rate of approximately 3 liters/minute to provide lubrication between the surface of the abrasive article and the glass test blank.

An initial surface finish on the glass test blank is evaluated with a diamond stylus profilometer, commercially available under the trade designation "SURTRONIC 3", commercially available from Taylor Hobson, Leicester, England. An initial thickness and weight of the glass test blank is also recorded.

The glass test blank is ground using the grinder described above. The grinding time interval of the grinder is set at 10 seconds. However, real time contact between the abrasive article and the glass test blank surface may be greater than the set time because the grinder will not begin timing until the abrasive article is stabilized on the glass test blank surface. That is, there may be some bouncing or skipping of the abrasive article on the glass surface and the grinder begins timing at the point when contact between the abrasive article and the glass surface is substantially constant. Thus, real time grinding interval, that is the contact between the abrasive article and the glass surface, is about 12 seconds. After grinding, final surface finish and a final weight or thickness are each recorded.

It will be understood that the actual time (rate) necessary to grind an actual glass workpiece to the desired specification will vary depending upon a number of factors, such as the polishing apparatus used, the backing pad under the abrasive article, the speed of the abrasive rotation, the size of the surface area to be polished, the contact pressure, the abrasive particle size, the amount of glass to be removed, and the initial condition of the surface to be ground, etc. The RPP procedure above simply provides a baseline performance characteristic that may be used to compare the article and the method according to the invention with conventional glass grinding techniques.

DETAILED DESCRIPTION OF THE INVENTION

The present invention pertains to articles and methods of finishing, that is, grinding and polishing glass surfaces with an abrasive article that comprises a backing and at least one three-dimensional abrasive coating preferably comprising diamond, agglomerate comprising diamond particles, or ceria particles dispersed within a binder bonded to a surface of the backing. The abrasive coating comprises a binder formed from a binder precursor and a plurality of abrasive particles or abrasive agglomerates, preferably diamond or ceria abrasive particles or agglomerates comprising diamond particles.

The end use of the glass may be in a home or commercial environment. The glass may be used for decorative purposes or structural purposes. The glass will have at least one finished surface. The glass may be relatively flat or it may have some contour associated with it. These contours may be in the shape of curves or corners. Examples of glass surfaces or workpieces include parts of optical components such as lenses, prisms, mirrors, CRT (cathode ray tube) screens, and the like. CRT screens are found extensively in display surfaces used in devices such as television sets, computer monitors, and the like. CRT screens range in size (as measured along the diagonal) of about 10 cm (4 inches) to about 100 cm (40 inches) or more. CRT screens have an outer surface that is convex and there is a radius of curvature.

Figure 1:
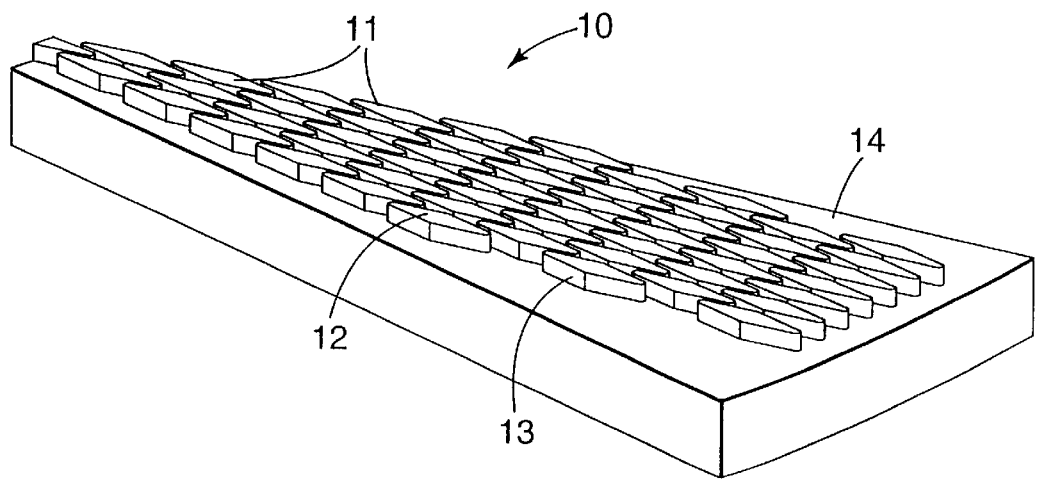
FIG. 1 is a perspective view of one embodiment of an abrasive article according to the present invention.
Figure 2:
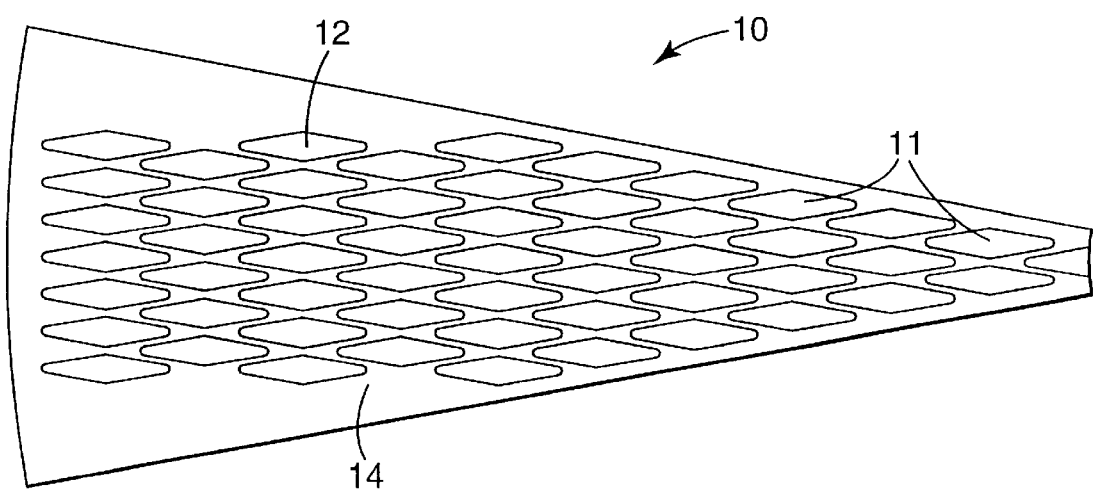
FIG. 2 is a top view of the abrasive article of FIG. 1.

Referring now to the Figures, one embodiment of an abrasive article 10 in accordance with the invention is illustrated in FIGS. 1 and 2. FIG. 1 is a perspective view of abrasive article 10 which includes an integrally molded backing 14 bearing on one major surface thereof a plurality of abrasive composites 11. Composites 11 are diamond-shaped and have a distal end or top surface 12 and a base 13. Abrasive composites 11 comprise a plurality of abrasive particles dispersed in an organic binder. The abrasive particles may be a mixture of different abrasive materials. Composites 11 are integrally molded with backing 14 along base 13. In almost all instances, backing 14 will be visible as land areas between composites 11. Composites 11 comprise organic resin and abrasive particles and any additional optional additives such as fillers, pigments, coupling agents, etc.

FIG. 2 is a top view of abrasive article 10, again showing composites 11 having top surface 12 on backing 14. Composites 11 may be located on the entire surface of backing 14, or a portion of backing 14 may be left uncovered by composites as shown in FIG. 2. Composites 11 are symmetrically and orderly located on backing 14.

It is preferred that bases 13 of adjacent abrasive composites be separated from one another by backing or land area 14. This separation allows, in part, the fluid medium to freely flow between the abrasive composites. This free flow of the fluid medium tends to contribute to a better cut rate surface finish or increased flatness during glass grinding. The spacing of the abrasive composites may vary from about 0.3 abrasive composite per linear cm to about 100 abrasive composite per linear cm, preferably between about 0.4 abrasive composites per linear cm to about 20 abrasive composite per linear cm, more preferably between about 0.5 abrasive composite per linear cm to about 10 abrasive composite per linear cm, and even more preferably between about 0.6–3.0 abrasive composites per linear cm. In one aspect of the abrasive article, there are at least about 5 composites/cm$^2$ and preferably at least 100 composites/cm$^2$. In a further embodiment of the invention, the area spacing of composites ranges from about 1 to 12,000 composites/cm$^2$.

Figure 3:
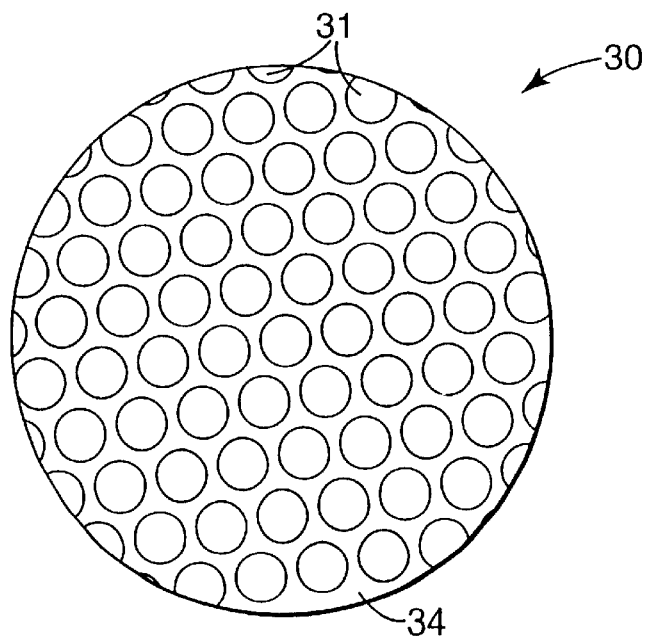
FIG. 3 is a top view of another embodiment of an abrasive article according to the present invention.

One preferred shape of the abrasive composites is generally a cylindrical post, as shown in FIG. 3; FIG. 3 is a top view of abrasive article 30 comprising circular abrasive composites 31. Backing 34 may be seen between composites 31. In FIG. 3, the entire surface of backing 34 (exclusive of any land area between composites) is covered by composites 31. It is preferred that the height of the abrasive composites 31 is constant across the abrasive article 30, but it is possible to have abrasive composites of varying heights. The height of the composites maybe a value from about 10 micrometers to about 25,000 micrometers (2.5 cm), preferably about 25 to about 15,000 micrometers, more preferably from about 100 to about 10,000 micrometers, and even more preferably from about 1,000 to about 8,000 micrometers. The diameter of the composites, at least for a cylindrical post composite, may be a value from about 1,000 micrometers (1.0 mm) to 25,000 micrometers (2.5 cm), preferably between 5,000 micrometers to 20,000 micrometers. A particularly preferred topography includes cylindrical posts having a height of about 9,500 micrometers (0.95 cm) with a base diameter of about 15,900 micrometers (1.59 cm). There are approximately 3,200 micrometers between the bases of adjacent posts. Another preferred topography includes cylindrical posts having a height of about 6,300 micrometers (0.63 cm) and a base diameter about 7,900 micrometers (0.79 cm). There are approximately 2,400 micrometers between the bases of adjacent posts.

Figure 4:
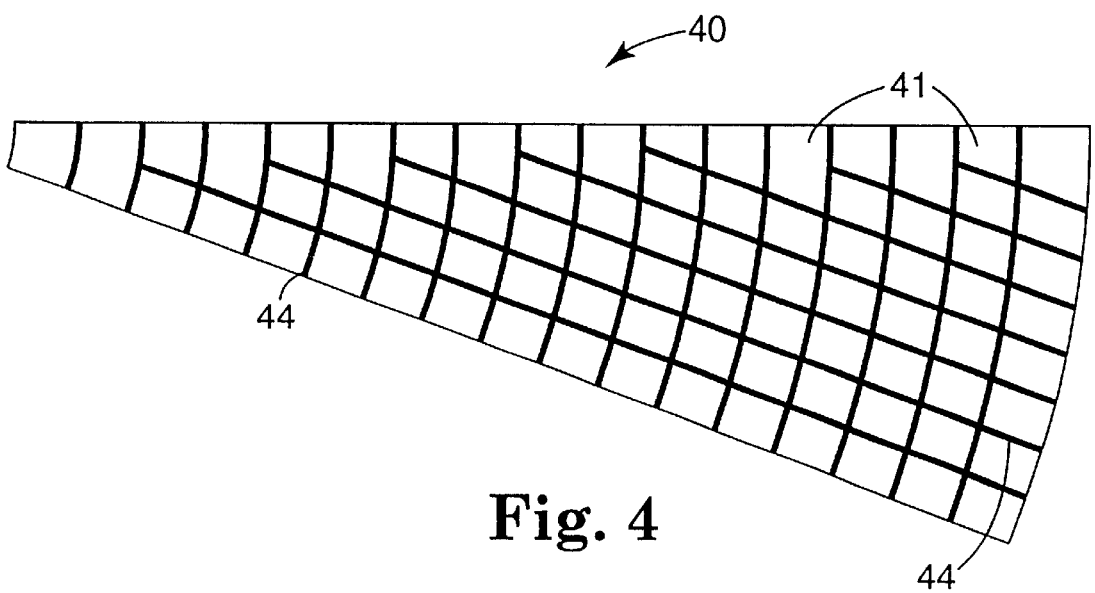
FIG. 4 is a top view of yet a third embodiment of an abrasive article according to the present invention.

FIG. 4 is a top view of a wedge or pie-shaped abrasive article 40. Composites 41 are arranged in arcuate sections with land areas 44 between the composites. Composites 41 are not identical in shape or size.

In some applications it may be desired to include a metal bonded abrasive segment located within an abrasive composite. Such a metal bonded abrasive segment will generally increase the grinding ability of the resulting abrasive article. The segment, for example, may be electroplated, hot pressed, sintered, or any other known segment. Abrasive particles, for example diamond particles, may be randomly dispersed throughout the segment or may be precisely spaced. The abrasive particles may be situated in layers or homogeneously throughout the segment. A particularly useful metal bonded abrasive segment may be made by the teaching of U.S. patent application Ser. No. 08/984,899, filed Dec. 4, 1997, now U.S. Pat. No. 6,196,911. These segments are preferably rectangular or circular in cross section, but any shape is feasible. It is desired that the segment completely fit within the side edges of the abrasive composite, that is, it does not extend above the top surface of the composite or beyond the side wall of the composite. Alternately, it may be desired to include a segment in the abrasive composite which is not metal bonded but has a glass or vitrified bond, or a ceramic, or a glass-ceramic bond.

Figure 5:
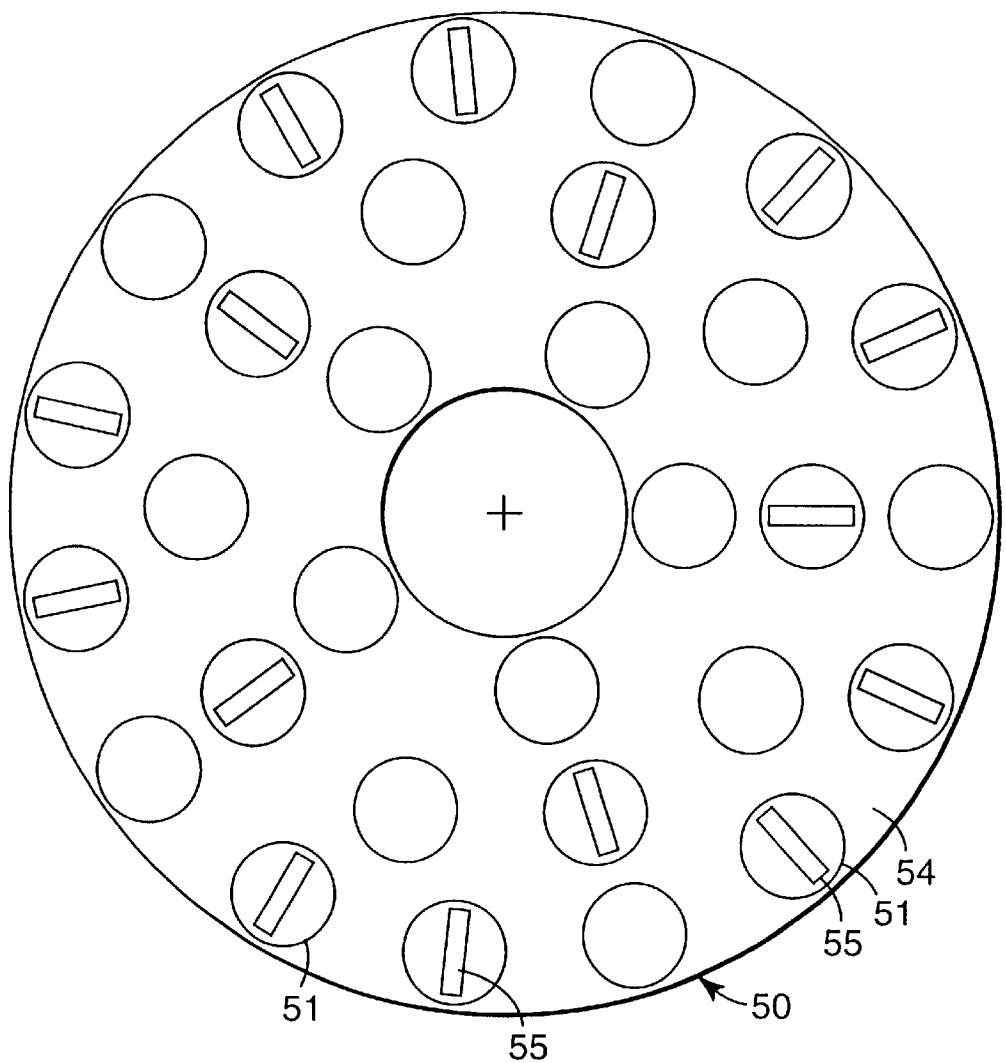
FIG. 5 is a top view of a fourth embodiment of an abrasive article according to the present invention.

FIG. 5 is a top view of abrasive article 50 which comprises abrasive composites 51 on backing 54. A portion of abrasive composites 51 have a metal bonded abrasive segments 55 embedded therein.

Figure 6A:
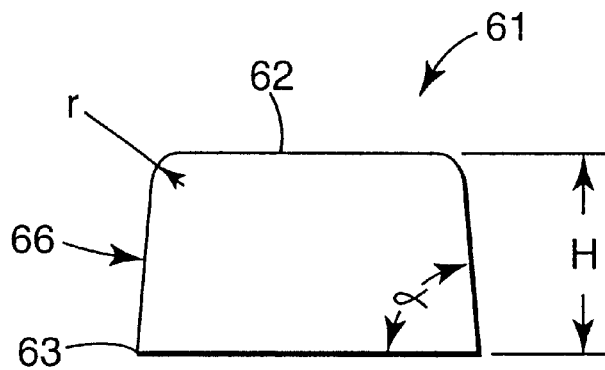
FIG. 6A is a side view of an abrasive composite of the present invention.
Figure 6B:
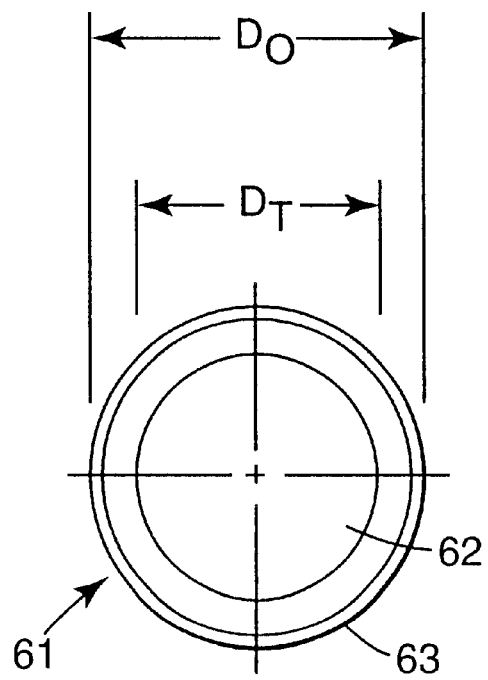
FIG. 6B is a top view of the abrasive composite of FIG. 6A.

FIGS. 6A and 6B show composite 61 in side and top views, respectively. FIG. 6A shows composite 61 having base 63 which is adjacent the backing (not shown) and top surface 62. Composite 61 has height H. Generally, the height of composites is between about 10 micrometers to about 30,000 micrometers (2.5 cm), preferably about 25 to about 15,000 micrometers, more preferably from about 100 to about 10,000 micrometers. In some embodiments, it may be desirable for composite 61 to be of a slightly tapered shaped, for example a pyramid or a cone. FIG. 6A shows composite 61 having an internal angle α, between base 63 and side wall 66, which defines the taper of composite 61. Angle α may be between 90° (that is, there is no taper to the composite) and about 45°. Preferably angle a is between 75° and 89.9°, more preferably between 80° and 89.7°, and even more preferably between 80° and 87°. It is theorized that a tapered composite may aid in the controlled break-down of the composite during use, and it also aids in removal of the composite from the tooling used for molding the composite. Also in FIG. 6A is shown radius r, which is the internal radius of the corner where side wall 66 meets top surface 62. It is generally preferred to have a slightly rounded or radiused corner because it is believed a rounded corner is easier to thoroughly fill with material (that is, resin and abrasive particles) and remove from the tooling.

FIG. 6B is a top view of composite 61. Base 63 has a diameter $D_O$ which is greater than diameter $D_T$ of top surface 62. For a circular composite such as 61, $D_O$ may be between about 1,000 micrometers to about 50,000 micrometers (2.5 cm). Likewise, $D_T$ may be between about 500 micrometers to about 50,000 micrometers. For any other cross-section shape, such as a square, rectangle, triangle, star, etc., the diameter of the composite is the difference between $D_O$ and $D_T$ is determined by the taper of composite 61 (directly related to angle α) and by the height H.

The abrasive composites preferably have a discernible shape. Initially, it is preferred that the abrasive particles do not protrude beyond the surface of the binder. As the abrasive article is being used to abrade a surface, the composite breaks down to reveal unused abrasive particles.

The abrasive composite shape may be any shape and may be selected from among a number of geometric shapes such as a cubic, block-like, cylindrical, prismatic, rectangular, pyramidal, truncated pyramidal, conical, truncated conical, cross, or post-like with a top surface which is flat. Another shape is hemispherical and is further described in U.S. Pat. No. 5,681,217. The resulting abrasive article may have a mixture of different abrasive composite shapes. It is foreseen that the cross section shape of the base may be different than the top surface. For example, the base of the abrasive composite could be square while the top surface is circular.

The bases of the abrasive composites may abut one another or alternatively, the bases of adjacent abrasive composites may be separated from one another by some specified distance, that is, the land area. It is to be understood that this definition of abutting also covers an arrangement where adjacent composites share a common abrasive land material or bridge-like structure which contacts and extends between facing sidewalls of the composites. The abrasive land material is generally formed from the same abrasive slurry used to form the abrasive composites or from the slurry used to form the backing.

The abrasive articles shown in FIGS. 1, 2, and 4 are designed to be used with a plurality of such articles. These pie- or wedge-shaped articles are generally arranged on a back-up pad to complete a 360° circle. This circle of abrasive articles is then used to grind glass workpieces such as TV and CRT screens. Alternately, only one of an article such as shown in FIGS. 3 and 5 need be arranged on a back-up pad to cover the entire back-up pad.

Regardless of the shape or dimensions of the individual abrasive composites, preferably about 20% to about 90%, more preferably about 30% to about 70%, and even more preferably about 40% to about 60% of the surface area of the backing will be covered by abrasive composites. Depending on the exact grinding process, the grinding may occur over the entire abrasive article or may be concentrated more in one area than another.

A. Binders

The binder is preferably formed from a binder precursor. The binder precursor comprises a resin that is in an uncured or unpolymerized state. During the manufacture of the abrasive article, the resin in the binder precursor is polymerized or cured, such that a binder is formed. The binder precursor may comprise a condensation curable resin, an addition polymerizable resin, a free radical curable resin, and/or combinations and blends of such resins.

One preferred binder precursor is a resin or resin mixture that polymerizes via a free radical mechanism. The polymerization process is initiated by exposing the binder precursor, along with an appropriate catalyst, to an energy source such as thermal energy or radiation energy. Examples of radiation energy include electron beam, ultraviolet light, or visible light.

Examples of free radical curable resins include acrylated urethanes, acrylated epoxies, acrylated polyesters, ethylenically unsaturated monomers, aminoplast monomers having pendant unsaturated carbonyl groups, isocyanurate monomers having at least one pendant acrylate group, isocyanate monomers having at least one pendant acrylate group, and mixtures and combinations thereof. The term acrylate encompasses acrylates and methacrylates.

One preferred binder precursor comprises a urethane acrylate oligomer, or a blend of a urethane acrylate oligomer and an ethylenically unsaturated monomer. The preferred ethylenically unsaturated monomers are monofunctional acrylate monomers, difunctional acrylate monomers, trifunctional acrylate monomers, or combinations thereof. The binder formed from these binder precursors provides the abrasive article with its desired properties. In particular, these binders provide a tough, durable, and long lasting medium to securely hold the abrasive particles throughout the life of the abrasive article. This binder chemistry is especially useful when used with diamond abrasive particles because diamond abrasive particles last substantially longer than most conventional abrasive particles. In order to take full advantage of the long life associated with diamond abrasive particles, a tough and durable binder is desired. Thus, this combination of urethane acrylate oligomer or blend of urethane acrylate oligomer with an acrylate monomer and diamond abrasive particles provides an abrasive coating that is long lasting and durable.

Examples of commercially available acrylated urethanes include those known by the trade designations "PHOTOMER" (for example, "PHOTOMER 6010"), commercially available from Henkel Corp., Hoboken, N.J.; "EBECRYL 220" (hexafunctional aromatic urethane acrylate of molecular weight 1,000), "EBECRYL 284" (aliphatic urethane diacrylate of 1,200 molecular weight diluted with 1,6-hexanediol diacrylate), "EBECRYL 4827" (aromatic urethane diacrylate of 1,600 molecular weight), "EBECRYL 4830" (aliphatic urethane diacrylate of 1,200 molecular weigh diluted with tetraethylene glycol diacrylate), "EBECRYL 6602" (trifunctional aromatic urethane acrylate of 1,300 molecular weight diluted with trimethylolpropane ethoxy triacrylate), and "EBECRYL 840" (aliphatic urethane diacrylate of 1,000 molecular weight), commercially available from UCB Radcure Inc., Smyrna, Ga.; "SARTOMER" (for example, "SARTOMER 9635, 9645, 9655, 963-B80, 966-A80", etc.), commercially available from Sartomer Company, West Chester, Pa.; and "UVITHANE" (for example, "UVITHANE 782"), commercially available from Morton International, Chicago, Ill.

The ethylenically unsaturated monomers or oligomers, or acrylate monomers or oligomers, may be monofunctional, difunctional, trifunctional or tetrafunctional, or even higher functionality. The term acrylate includes both acrylates and methacrylates. Ethylenically unsaturated binder precursors include both monomeric and polymeric compounds that contain atoms of carbon, hydrogen, and oxygen, and optionally, nitrogen and the halogens. Ethylenically unsaturated monomers or oligomers preferably have a molecular weight of less than about 4,000, and are preferably esters made from the reaction of compounds containing aliphatic monohydroxy groups or aliphatic polyhydroxy groups and unsaturated carboxylic acids, such as acrylic acid, methacrylic acid, itaconic acid, crotonic acid, isocrotonic acid, maleic acid, and the like. Representative examples of ethylenically unsaturated monomers include methyl methacrylate, ethyl methacrylate, styrene, divinylbenzene, hydroxy ethyl acrylate, hydroxy ethyl methacrylate, hydroxy propyl acrylate, hydroxy propyl methacrylate, hydroxy butyl acrylate, hydroxy butyl methacrylate, vinyl toluene, ethylene glycol diacrylate, polyethylene glycol diacrylate, ethylene glycol dimethacrylate, hexanediol diacrylate, triethylene glycol diacrylate, trimethylolpropane triacrylate, glycerol triacrylate, pentaerthyitol triacrylate, pentaerythritol trimethacrylate, pentaerythritol tetraacrylate and pentaerythritol tetramethacrylate. Other ethylenically unsaturated monomers or oligomers include monoallyl, polyallyl, and polymethallyl esters and amides of carboxylic acids, such as diallyl phthalate, diallyl adipate, and N,N-diallyladipamide. Still other nitrogen containing compounds include tris(2-acryl-oxyethyl)isocyanurate, 1,3,5-tri(2-methacryloxyethyl)-s-triazine, acrylamide, methylacrylamide, N-methyl-acrylamide, N,N-dimethylacrylamide, N-vinyl-pyrrolidone, and N-vinyl-piperidone, and "CMD 3700", commercially available from Radcure Specialties. Examples of ethylenically unsaturated diluents or monomers may be found in U.S. Pat. Nos. 5,236,472 and 5,580,647.

In general, the ratio between these acrylate monomers depends upon the weight percent of diamond abrasive particles and any optional additives or fillers desired in the final abrasive article. Typically, these acrylate monomers range from about 5 parts by weight to about 95 parts by weight urethane acrylate oligomer to about 5 parts by weight to about 95 parts by weight ethylenically unsaturated monomer. Additional information concerning other potential useful binders and binder precursors may be found in PCT WO 97/11484 and U.S. Pat. No. 4,773,920.

Acrylated epoxies are diacrylate esters of epoxy resins, such as the diacrylate esters of bisphenol A epoxy resin. Examples of commercially available acrylated epoxies include those having the trade designations "CMD 3500", "CMD 3600", and "CMD 3700", commercially available from Radcure Specialties; and "CN103", "CN104", "CN111", "CN112", and "CN114", commercially available from Sartomer Company.

Examples of polyester acrylates include "PHOTOMER 5007" and "PHOTOMER 5018", commercially available from Henkel Corporation.

Aminoplast monomers have at least one pendant alpha, beta-unsaturated carbonyl group. These unsaturated carbonyl groups may be acrylate, methacrylate or acrylamide type groups. Examples of such materials include N-(hydroxymethyl)-acrylamide, N,N'-oxydimethylenebisacrylamide, ortho and para acrylamidomethylated phenol, acrylamidomethylated phenolic novolac, and combinations thereof. These materials are further described in U.S. Pat. Nos. 4,903,440 and 5,236,472.

Isocyanurates having at least one pendant acrylate group and isocyanate derivatives having at least one pendant acrylate group are further described in U.S. Pat. No. 4,652,274. The preferred isocyanurate material is a triacrylate of tris(hydroxy ethyl) isocyanurate.

Depending upon how the free radical curable resin is cured or polymerized, the binder precursor may further comprise a curing agent, (which is also known as a catalyst or initiator). When the curing agent is exposed to the appropriate energy source, it will generate a free radical source that will start the polymerization process.

The preferred binder precursor comprises an epoxy resin. Epoxy resins have an oxirane ring and are polymerized by a ring opening reaction. Such epoxide resins include monomeric epoxy resins and polymeric epoxy reins. Examples of some preferred epoxy resins include 2,2-bis-4-(2,3-epoxypropoxy)-phenyl)propane, a diglycidyl ether of bisphenol, commercially available materials under the trade designation "EPON 828", "EPON 1004", and "EPON 1100F", commercially available from Shell Chemical Co., Houston, Tex., and "DER-331", "DER-332", and "DER-334", commercially available from Dow Chemical Co, Midland, Mich. Other suitable epoxy resins include cycloaliphatic epoxies, glycidyl ethers of phenol formaldehyde novolac (for example, "DEN-431" and "DEN-428"), commercially available from Dow Chemical Co. The blend of free radical curable resins and epoxy resins are further described in U.S. Pat. Nos. 4,751,138 and 5,256,170.

B. Backing Materials

Backings serve the function of providing a support for the abrasive composite formed by the combination of binder and abrasive particles. Backings useful in the invention must be capable of adhering to the binder after exposure of binder precursor to curing conditions, and are preferably flexible after said exposure so that the articles used in the inventive method may conform to surface contours, radii, and irregularities in the glass.

In many glass finishing applications, the backing needs to be strong and durable so that the resulting abrasive article is long lasting. Additionally, in some grinding applications the backing needs to be strong and flexible so that the abrasive article may conform uniformly to the glass workpiece. This is typically true when the surface of the glass workpiece has a shape or contour associated with it. The backing may be a polymeric film, paper, vulcanized fiber, a molded or cast elastomer, a treated nonwoven backing, or a treated cloth backing to provide these properties of strength and conformability. Examples of polymeric film include polyester film, co-polyester film, polyimide film, polyamide film, and the like. A nonwoven, including paper, may be saturated with either a thermosetting or thermoplastic material to provide the necessary properties. Any of the above backing materials may further comprise additives such as: fillers, fibers, dyes, pigments, wetting agents, coupling agents, plasticizers, and the like. Preferably, the backings used for glass polishing abrasive articles of the invention contain one or more types of fibers, for example fibers of silicate, metal, glass, carbon, ceramic, high modulus organic, and any combination thereof. The backings of the invention may also contain a reinforcing scrim or cloth for example, a cloth of NOMEX™, available from DuPont Company, Wilmington, Del.

In some instances it may be preferable to have an integrally molded backing, that is a backing directly molded adjacent the composites instead of independently attaching the composites to a backing such as, for example, a cloth. The backing may be molded or cast onto the back of the composites after the composites are molded, or molded or cast simultaneously with the composites. The backing may be molded from either thermal or radiation curable thermoplastic or thermosetting resins. Examples of typical and preferred thermosetting resins include phenolic resins, aminoplast resins, urethane resins, epoxy resins, ethylenically unsaturated resins, acrylated isocyanurate resins, urea-formaldehyde resins, isocyanurate resins, acrylated urethane resins, acrylated epoxy resins, bismaleimide resins, and mixtures thereof. Examples of preferred thermoplastic resins include polyamide resins (for example, nylon), polyester resins and polyurethane resins (including polyurethane-urea resins). One preferred thermoplastic resin is a polyurethane derived from the reaction product of a polyester polyol and an isocyanate.

It is within the scope of this invention that the backing chemistry is identical or is similar to the chemistry of the composites.

C. Abrasive Particles

Figure 7:
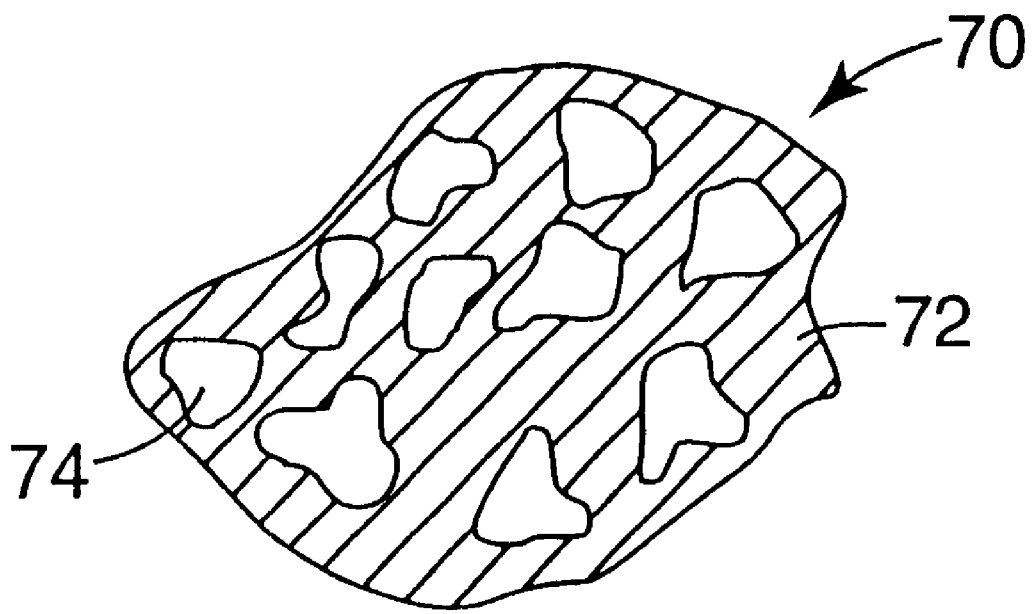
FIG. 7 is a representation in cross-section of an agglomerate according to the present invention.

The abrasive articles according to the invention also include a plurality of abrasive particles or abrasive agglomerates. FIG. 7 shows an abrasive agglomerate of the invention. Abrasive agglomerate 70 comprises single abrasive particles 74 dispersed within a permanent binder 72. The permanent binder 72 may be glass, ceramic, metal, or an organic binder as described above. Preferably, single abrasive particles 74 comprise single diamond particles. Preferably, the single diamond particles used in agglomerates have a size ranging from about 1 to about 100 micrometers. A preferred permanent binder is "SP1086" glass powder, commercially available from Specialty Glass Inc., Oldsmar, Fla.

Generally, the average size of the agglomerate particles comprising diamond particles larger than 15 micrometers is about 100 to about 1000 micrometers, preferably about 100 to about 400 micrometers and more preferably about 225 to about 350 micrometers. However, the average size of the agglomerate particles which comprise diamond particles less than 15 micrometers is about 20 to about 450 micrometers, preferably about 40 to about 400 micrometers and more preferably about 70 to about 300 micrometers.

Abrasive agglomerates are further described in U.S. Pat. Nos. 4,311,489; 4,652,275; and 4,799,939. The abrasive particle may further comprise a surface treatment or coating, such as a coupling agent or metal or ceramic coatings.

Abrasive particles useful in the invention preferably have an average particle size about 0.01 micrometer (small particles) to 500 micrometers (large particles), more preferably about 3 micrometers to about 500 micrometers, and even more preferably about 5 micrometers to about 400 micrometers. Occasionally, abrasive particle sizes are reported as "mesh" or "grade", both of which are commonly known abrasive particle sizing methods. It is preferred that the abrasive particles have a Mohs hardness of at least 8, more preferably at least 9. Examples of such abrasive particles include fused aluminum oxide, ceramic aluminum oxide, heated treated aluminum oxide, silicon carbide, alumina zirconia, iron oxide, diamond (natural and synthetic), ceria, cubic boron nitride, garnet, and combinations thereof.

For glass grinding, it is preferred that the abrasive article use diamond abrasive particles or abrasive agglomerates comprising diamonds. These diamond abrasive particles may be natural or synthetically made diamond and may be considered "resin bond diamonds", "saw blade grade diamonds", or "metal bond diamonds". The single diamonds may have a blocky shape associated with them or alternatively, a needle like shape. The single diamond particles may contain a surface coating such as a metal coating (for example, nickel, aluminum, copper or the like), an inorganic coating (for example, silica), or an organic coating. The abrasive article of the invention may contain a blend of diamond with other abrasive particles. For glass polishing, it is preferred that the abrasive article use ceria abrasive particles.

The three-dimensional abrasive coating, that is, the abrasive composites, may comprise by weight anywhere between about 0.1 part abrasive particles or agglomerates to 90 parts abrasive particles or agglomerates and 10 parts binder to 99.9 parts binder, where the term "binder" includes any fillers and/or other additives other than the abrasive particles. However, due to the expense associated with diamond abrasive particles, it is preferred that the abrasive coating comprise about 0.1 to 50 parts abrasive particles or agglomerates and about 50 to 99.9 parts binder by weight. More preferably, the abrasive coating comprises about 1 to 30 parts abrasive particles or agglomerates and about 70 to 99 parts binder by weight, and even more preferably the abrasive coating comprises about 1.5 to 10 parts abrasive particles or agglomerates and about 90 to 98.5 parts binder by weight. A particularly useful range of diamond abrasive particles is between 2 and 4 weight percent of diamonds in the abrasive composites. If the abrasive article of the invention contains ceria particles as the primary abrasive in the abrasive composites, the ceria particles are preferably present in an amount of from 1 to 95 parts by weight and more preferably, from 10 to 95 parts by weight with the balance being binder.

D. Additives

The abrasive coating and the backings of this invention may further comprise optional additives, such as, abrasive particle surface modification additives, coupling agents, fillers, expanding agents, fibers, antistatic agents, curing agents, suspending agents, photosensitizers, lubricants, wetting agents, surfactants, pigments, dyes, TV stabilizers, and anti-oxidants. The amounts of these materials are selected to provide the properties desired.

A coupling agent may provide an association bridge between the binder and the abrasive particles. Additionally, the coupling agent may provide an association bridge between the binder and the filler particles. Examples of coupling agents include silanes, titanates, and zircoaluminates. There are various means to incorporate the coupling agent. For example, the coupling agent may be added directly to the binder precursor. The abrasive coating may contain anywhere from about 0 to 30%, preferably between 0.1 to 25% by weight coupling agent. Alternatively, the coupling agent may be applied to the surface of the filler particles or the abrasive particles. The abrasive particle may contain anywhere from about 0 to 3% by weight coupling agent, based upon the weight of the abrasive particle and the coupling agent. Examples of commercially available coupling agents include "A174" and "A1230", commercially available from OSi Specialties, Danbury, Conn. Still another example of a commercial coupling agent is an isopropyl triisosteroyl titanate, commercially available from Kenrich Petrochemicals, Bayonne, N.J., under the trade designation "KR-TTS".

The abrasive coating may further optionally comprise a filler. A filler is a particulate material and generally has an average particle size range between 0.1 to 50 micrometers, typically between 1 to 30 micrometers. Examples of useful fillers for this invention include: metal carbonates (such as calcium carbonate—chalk, calcite, marl, travertine, marble, and limestone; calcium magnesium carbonate, sodium carbonate, and magnesium carbonate), silica (such as quartz, glass beads, glass bubbles, and glass fibers), silicates (such as talc, clays—montmorillonite; feldspar, mica, calcium silicate, calcium metasilicate, sodium aluminosilicate, sodium silicate, lithium silicate, and hydrous and anhydrous potassium silicate), metal sulfates (such as calcium sulfate, barium sulfate, sodium sulfate, aluminum sodium sulfate, aluminum sulfate), gypsum, vermiculite, wood flour, aluminum trihydrate, carbon black, metal oxides (such as calcium oxide—lime; aluminum oxide, tin oxide—for example, stannic oxide; titanium dioxide) and metal sulfites (such as calcium sulfite), thermoplastic particles (polycarbonate, polyetherimide, polyester, polyethylene, polysulfone, polystyrene, acrylonitrile-butadiene-styrene block copolymer, polypropylene, acetal polymers, polyurethanes, nylon particles) and thermosetting particles (such as phenolic bubbles, phenolic beads, polyurethane foam particles), and the like. The filler may also be a salt such as a halide salt. Examples of halide salts include sodium chloride, potassium cryolite, sodium cryolite, ammonium cryolite, potassium tetrafluoroborate, sodium tetrafluoroborate, silicon fluorides, potassium chloride, and magnesium chloride. Examples of metal fillers include, tin, lead, bismuth, cobalt, antimony, cadmium, iron titanium. Other miscellaneous fillers include sulfur, organic sulfur compounds, graphite, and metallic sulfides.

An example of a suspending agent is an amorphous silica particle having a surface area less than 150 meters squarelgram, commercially available from DeGussa Corp., Ridgefield Park, N.J., under the trade designation "OX-50". The addition of the suspending agent may lower the overall viscosity of the abrasive slurry. The use of suspending agents is further described in U.S. Pat. No. 5,368,619.

It may be desirable in some embodiments to form an abrasive slurry which has controllable settling of the abrasive particles. As an example, it may be possible to form an abrasive slurry having diamond abrasive particles homogeneously mixed throughout. After casting or molding the composites and backing from the slurry, the diamond particles may settle out at a controlled rate so that by the time the organic resin has hardened to the point where the diamond particles may -no longer settle, the diamond particles have departed from the backing and are located only in the composites.

The binder precursor may further comprise a curing agent. A curing agent is a material that helps to initiate and complete the polymerization or crosslinking process such that the binder precursor is converted into a binder. The term curing agent encompasses initiators, photoinitiators, catalysts and activators. The amount and type of the curing agent will depend largely on the chemistry of the binder precursor.

Polymerization of ethylenically unsaturated monomer(s) or oligomer(s) occurs via a free-radical mechanism. If the energy source is an electron beam, the electron beam generates free-radicals which initiate polymerization. However, it is within the scope of this invention to use initiators even if the binder precursor is exposed to an electron beam. If the energy source is heat, ultraviolet light, or visible light, an initiator may have to be present in order to generate free-radicals. Examples of initiators (that is, photoinitiators) that generate free-radicals upon exposure to ultraviolet fight or heat include, but are not limited to, organic peroxides, azo compounds, quinones, nitroso compounds, acyl halides, hydrazones, mercapto compounds, pyryliurn compounds, imidazoles, chlorotriazines, benzoin, benzoin alkyl ethers, diketones, phenones, and mixtures thereof. An example of a commercially available photoinitiator that generates free radicals upon exposure to ultraviolet light include those having the trade designation "IRGACUTRE 651" and "IRGACURE 184", commercially available from the Ciba Geigy Company, Hawthorne, N.J., and "DAROCUR 1173", commercially available from Merck & Company, Incorporated, Rahway, N.J. Examples of initiators that generate free-radicals upon exposure to visible light may be found in U.S. Pat. No. 4,735,632. Another photoinitiator that generates free-radicals upon exposure to visible light has the trade designation "IRGACURE 369", commercially available from Ciba Geigy Company.

Typically, the initiator is used in amounts ranging from 0.1 to 10%, preferably 2 to 4% by weight, based on the weight of the binder precursor. Additionally, it is preferred to disperse, preferably uniformly disperse, the initiator in the binder precursor prior to the addition of any particulate material, such as the abrasive particles and/or filler particles.

In general, it is preferred that the binder precursor be exposed to radiation energy, preferably ultraviolet light or visible light. In some instances, certain abrasive particles and/or certain additives will absorb ultraviolet and visible light, which makes it difficult to properly cure the binder precursor. This phenomena is especially true with ceria abrasive particles and silicon carbide abrasive particles. It has been found, quite unexpectedly, that the use of phosphate containing photoinitiators, in particular acylphosphine oxide containing photoinitiators, tend to overcome this problem. An example of such a photoinitiator is 2,4,6- trimethylbenzoyldiphenylphosphine oxide, commercially available from BASF Corporation, Charlotte, N.C., under the trade designation "LUCIRIN TPO". Other examples of commercially available acylphosphine oxides include those having the trade designation "DAROCUR 4263" and "DAROCUR 4265", both commercially available from Merck & Company.

Optionally, the curable compositions may contain photosensitizers or photoinitiator systems which affect polymerization either in air or in an inert atmosphere, such as nitrogen. These photosensitizers or photoinitiator systems include compounds having carbonyl groups or tertiary amino groups and mixtures thereof. Among the preferred compounds having carbonyl groups are benzophenone, acetophenone, benzil, benzaldehyde, o-chlorobenzaldehyde, xanthone, thioxanthone, 9,10-anthraquinone, and other aromatic ketones which may act as photosensitizers. Among the preferred tertiary amines are methyldiethanolamine, ethyldiethanolamine, triethanolamine, phenylmethylethanolamine, and dimethylaminoethylbenzoate. In general, the amount of photosensitizer or photoinitiator system may vary from about 0.01 to 10% by weight, more preferably from 0.25 to 4.0% by weight, based on the weight of the binder precursor. Examples of photosensitizers include those having the trade designation "QUANTICURE ITX", "QUANTICURE QTX", "QUANTICURE PTX", "QUANTICURE EPD", all commercially available from Biddle Sawyer Corp, New York, N.Y.

The first step to make the abrasive article is to prepare the abrasive slurry. The abrasive slurry is made by combining together by any suitable mixing technique the binder precursor, the abrasive particles or agglomerates, and the optional additives. Examples of mixing techniques include low shear and high shear mixing, with high shear mixing being preferred. Ultrasonic energy may also be utilized in combination with the mixing step to lower the abrasive slurry viscosity. Typically, the abrasive particles or agglomerates are gradually added into the binder precursor. It is preferred that the abrasive slurry be a homogeneous mixture of binder precursor, abrasive particles or agglomerates, and optional additives. If necessary, water and/or solvent may be added to lower the viscosity. The amount of air bubbles in the abrasive slurry may be minimized by pulling a vacuum either during or after the mixing step. In some instances it is preferred to heat, generally in the range from about 30° C. to about 100° C., the abrasive slurry to lower the viscosity. It is important the abrasive slurry be monitored before coating to ensure a rheology that coats well and in which the abrasive particles or agglomerates and other fillers do not settle before coating.

The diamond agglomerates are generally made by mixing together a temporary binder, a permanent binder (for example, glass, ceramic, metal), and the single abrasive particles with a sufficient amount of a solvent, usually water, to wet the ingredients so to make a moldable paste. However, if the permanent binder is an organic binder, then a temporary binder is not required. The moldable paste is placed into a suitable mold, air dried, and the hardened agglomerates are removed. The agglomerates are then separated into individual agglomerates using a classification means such as a screen, and then fired in air to produce the final, dried agglomerates. In the case of an organic permanent binder, the particles are not fired, but treated in a manner to cure the organic binder.

One method of producing the abrasive article comprising abrasive composites uses a production tool or mold containing a plurality of cavities. These cavities are essentially the inverse shape of the desired abrasive composites and are responsible for generating the shape of the abrasive composites. The number of cavities/square unit area results in the abrasive article having a corresponding number of abrasive composites/square unit area. These cavities may have any geometric shape such as a cylinder, dome, pyramid, rectangle, truncated pyramid, prism, cube, cone, truncated cone, or any shape having a top surface cross-section being a triangle, square, circle, rectangle, hexagon, octagon, or the like. The dimensions of the cavities are selected to achieve the desired number of abrasive composites/square unit area. The cavities may be present in a dot like pattern with spaces between adjacent cavities or the cavities may butt up against one another.

The abrasive slurry may be coated into the cavities of the mold by any conventional technique such as die coating, vacuum die coating, spraying, roll coating, transfer coating, knife coating, and the like. If the mold comprises cavities that either have either flat tops or relatively straight side walls, then it is preferred to use a vacuum during coating to minimize any air entrapment.

The mold may be a belt, a sheet, a continuous sheet or web, a coating roll such as a rotogravure roll, a sleeve mounted on a coating roll, or die and may be composed of metal, including a nickel-plated surface, metal alloys, ceramic, or plastic. Further information on production tools, their production, materials, etc. may be found in U.S. Pat. Nos. 5,152,917 and 5,435,816.

When the abrasive slurry comprises a thermosetting binder precursor, the binder precursor is cured or polymerized. This polymerization is generally initiated upon exposure to an energy source. In general, the amount of energy depends upon several factors such as the binder precursor chemistry, the dimensions of the abrasive slurry, the amount and type of abrasive particles, and the amount and type of the optional additives. Radiation energy is one preferred energy source. The radiation energy sources include electron beam, ultraviolet light, or visible light.

Other details on the use of a production tool to make the abrasive article is further described in U.S. Pat. No. 5,152,917, where the coated abrasive article that is produced is an inverse replica of the production tool, and U.S. Pat. No. 5,435,816.

The abrasive article may be converted into any desired shape or form depending upon the desired configuration for glass grinding. This converting may be accomplished by slitting, die cutting, or any suitable means.

It is preferable that the abrasive article of the present invention have an integrally molded backing, that is, the abrasive composites are directly bonded to a resin backing which is cast or molded onto the composites while the composites are still in the cavities of the mold. Preferably, the backing is molded before the organic resin of the abrasive composites has completely cured, to allow a better adhesion between the composites and the backing. It may be desirable to include a primer or adhesion promoter to the surface of the composites before the backing is cast to ensure proper adhesion of the backing.

Preferably the backing is from about 1 mm to 2 cm thick, more preferably about 0.5 cm to 1 cm thick. The resulting abrasive article should be resilient and compliable to allow it to conform to any back-up pad which may have a curvature or radius associated therewith. In some cases it may be desired to mold the backing with a pre-formed curvature.

The backing may be cast or molded from the same resin as the composites, or may be cast from a different material.

Examples of particularly useful backing resins include urethanes, epoxies, acrylates, and acrylated urethanes. It is preferable that the backing does not include abrasive particles therein, since these particles would generally not be used for any grinding purposes. However, fillers, fibers, or other additives may be incorporated into the backing. Fibers may be incorporated into the backing so to increase the adhesion between the backing and the abrasive composites. Examples of fibers useful in the backings of the invention include those made from silicates, metals, glass, carbon, ceramic, and organic materials. Preferred fibers for use in the backing are calcium silicate fiber, steel fiber, glass fiber, carbon fiber, ceramic fiber, and high modulus organic fibers.

In certain applications it may be desirable to have a more durable and tear-resistant backing which can be accomplished by the inclusion of a scrim material or the like within the molded backing. During molding of the backing, it is possible to lay a scrim or other material over the cavities already filled with resin (but not cured) and then apply another layer of resin over the scrim; or, it is possible to lay a scrim or other material over the uncured molded backing. Preferably, any scrim or additive backing material is sufficiently porous to allow the backing resin to penetrate through and engulf the material.

Useful scrim materials generally are lightweight, open-weave coarse fabrics. Suitable materials include metal or wire meshes, fabrics such as cotton, polyester, rayon, glass cloth, or other reinforcing materials such as fibers. The scrim or reinforcing material may be pretreated to increase the adhesion of the resin to the scrim.

Typical Methods of Grinding Glass

The abrasive articles of the invention used in grinding glass surfaces surprisingly remove large quantities of material yet provide smooth surfaces in relatively short periods of time. During grinding, the abrasive article moves relative to the glass surface and is forced downward onto the glass surface, preferably the force ranging from about 0.5 g/mm$^2$ to about 25 g/mm$^2$, more preferably from about 0.7 g/mm$^2$ to about 20 g/mm2, and even more preferably about 10 g/mm$^2$. If the downward force is too high, then the abrasive article may not refine the scratch depth and in some instances may increase the scratch depth. Also, the abrasive article may wear excessively if the down force is too high. Conversely, if the downward force is too low, the abrasive article may not effectively remove sufficient glass material. In some applications, the glass workpiece may be forced downward onto the abrasive article.

As stated, the glass or the abrasive article or both will move relative to the other during the grinding step. This movement may be a rotary motion, a random motion, or linear motion. Rotary motion may be generated by attaching an abrasive disc to a rotary tool. The glass surface and abrasive article may rotate in the same direction or opposite directions, but if in the same direction, at different rotational speeds. For machines, operating rpm may range up to about 4,000 rpm, preferably from about 25 rpm to about 2,000 rpm, and more preferably from about 50 rpm to about 1,000 rpm, depending on the abrasive article employed. A random orbital motion may be generated by a random orbital tool, and linear motion may be generated by a continuous abrasive belt. The relative movement between glass and abrasive article may also depend on the dimensions of the glass. If the glass is relatively large, it may be preferred to move the abrasive article during grinding while the glass is held stationary.

It is preferred to grind the glass in the presence of a liquid. The liquid inhibits heat build up during grinding and removes the swarf away from the grinding interface. "Swarf" is the term used to describe the actual glass debris that is abraded away by the abrasive article. In some instances, the glass swarf may damage the surface of the glass being ground. Thus, it is desirable to remove the swarf from the interface. Water is generally the preferred liquid.

In many instances, the abrasive article is bonded to a support pad. The support pad may be made from a polyurethane foam, rubber material, an elastomer, a rubber based foam or any other suitable material, and may be designed to be conformable to the workpiece contour. The hardness and/or compressibility of the support pad material is selected to provide the desired grinding characteristics (cut rate, abrasive article product life, and glass workpiece surface finish).

The support pad may have a continuous and relatively flat surface that the abrasive article is secured to. Alternatively, the support pad may have a discontinuous surface in which there exists a series of raised portions and lower portions in which the abrasive article is secured to. In the case of a discontinuous surface, the abrasive article may be secured to only the raised portions. Conversely, an abrasive article may be secured to more than one raised portion, such that the entire abrasive article is not fully supported. The discontinuous surface in the support pad is selected to provide the desired fluid flow of the water and the desired grinding characteristics (cut rate, abrasive article product life, and glass workpiece surface finish).

The support pad may have any shape such as circular, rectangular, square, oval, and the like. The support pad may range in size (longest dimension) from about 5 cm to 1,500 cm.

Attachment

The abrasive article may be secured to the support pad by a pressure sensitive adhesive, hook and loop attachment, a mechanical attachment or a permanent adhesive. The attachment should be such that the abrasive article is firmly secured to the support pad and survive the rigors of glass grinding (wet environment, heat generation, and pressures).

Representative examples of pressure sensitive adhesives suitable for this invention include latex crepe, rosin, acrylic polymers, and copolymers; for example, polybutylacrylate, polyacrylate ester, vinyl ethers; for example, polyvinyl n-butyl ether, alkyd adhesives, rubber adhesives; for example, natural rubber, synthetic rubber, chlorinated rubber, and mixtures thereof.

Alternatively, the abrasive article may contain a hook and loop type attachment system to secure the abrasive article to the support pad. The loop fabric may be on the back side of the coated abrasive with hooks on the back-up pad. Alternatively, the hooks may be on the back side of the coated abrasive with the loops on the back-up pad. This hook and loop type attachment system is further described in U.S. Pat. Nos. 4,609,581; 5,254,194; and 5,505,747, and PCT WO 95/19242.

EXAMPLES

The following Test Procedure and non-limiting Examples will further illustrate the invention. All parts, percentages, ratios, and the like, in the Examples are by weight, unless otherwise indicated.

The following material abbreviations are used throughout the examples.

| | |
|---|---|
| ADI | polytetramethyl glycol/toluene diisocyanate prepolymer, commercially available from Uniroyal Chemical Co., Charlotte, NC, under the trade designation "ADIPRENE L-100" |
| AER | amorphous fumed silica filler, commercially available from Cabot Corporation, Tuscola, IL, under the trade designation "CAB-O-SIL M5" |
| AMI | aromatic amine (dimethyl thio toluene diamine), commercially available from Albemarle Corporation, Baton Rouge, LA, under the trade designation "ETHACURE 300" |
| APS | an anionic polyester surfactant, commercially available from ICI Americas, Inc., Wilmington, DE, under the trade designation "FP4" and "PS4" |
| A-1100 | Silane gamma-aminopropyl triethoxysilane, commercially available from OSi Specialties, Danbury, CT |
| BD | is polyvinyl butyral resin used as a temporary binder for diamond particles, commercially available from Monsanto, Springfield, MA, under the trade designation "BUTVAR DISPERSION" |
| CaCO3 | calcium carbonate filler |
| CERIA | cerium oxide, commercially available from Rhone-Poulenc, Shelton, CT, under the trade designation "POLISHING OPALINE" |
| CMSK | treated calcium metasilicate filler, commercially available from NYCO, Willsboro, NY, under the trade designation "WOLLASTOCOAT 400" |
| DIA | industrial diamond particles (in various sizes), commercially available from General Electric, Worthington, OH, under the trade designation "RVG", "Type W" |
| EPO | epoxy resin, commercially available from Shell Chemical Co., Houston, TX, under the trade designation "EPON 828" |
| ETH | aromatic amine (diethyl toluene diamine), commercially available from Albemarle Corporation, Baton Rouge, LA, under the trade designation "ETHACURE 100" |
| GLP | is a glass powder having a particle size of about 325 mesh, commercially available from Specialty Glass, Inc., Oldsmar, FL, under product number SP1086 and is used as a permanent binder for abrasive particles |
| Graphite | Graphite powder, commercially available from Southwestern Graphite Company, a division of Dixon Ticonderoga Company, Burnet, TX, under the trade designation "Grade No. 200-09 Graphite Powder" |
| KBF4 | potassium fluoroborate, commercially available from Atotech USA, Inc., Rock Hill, SC, then pulverized to less than 78 micron |
| K-SS | anhydrous potassium silicate, commercially available from PQ Corporation, Valley Forge, PA, under the trade designation "KASOLV SS" |
| K-16 | hydrous potassium silicate, commercially available from PQ Corporation, Valley Forge, PA, under the trade designation "KASOLV 16" |
| Moly | molybdenum disulfide, commercially available from Aldrich Chemical Company, Milwaukee, WI |
| RIO | red iron oxide pigment particles |
| RNH DIA | industrial diamond particles (in various sizes), commercially available from American Boarts Crushing Company Inc., Boca Raton, FL, Type RB and further classified to the desired particle size and measured using a Coulter Multisizer |
| SR339 | 2-phenoxyethyl acrylate, commercially available from Sartomer Company, Exton, PA, under the trade designation "SR339" |
| TFS | trifluoropropylmethyl siloxane antifoamer, commercially available from Dow Corning Company, Midland, MI, under the trade designation "7" |
| URE | polytetramethylene glycol/toluene diisocyanate prepolymer, commercially available from Uniroyal Chemical Co., Charlotte, NC, under the trade designation "ADIPRENE L-167" |
| VAZO | 1,1'-azobis(cyclohexanonecarbonitrile), 98%, commercially available from Aldrich Chemical Company, Inc., Milwaukee, WI |
| W-G | calcium silicate fibers, commercially available from NYCO Minerals, Inc., Willsboro, NY, under the trade designation "NYAD G Special" |

Abrasive Composite Topographies

A production tool was made by drilling a pattern of tapered holes into a 25.0 mm thick sheet of TEFLON™ brand polytetrafluoroethylene (PTFE). The resulting polymeric production tool contained cavities that were in the shape of cylindrical posts. The height of each post was about 6,300 micrometers and the diameter was about 7,900 micrometers. There were approximately 2,400 micrometers between the bases of adjacent posts.

Test Procedure

The test procedure utilized a "BUEHLER ECOMET 4" variable speed grinder on which was mounted a "BUEHLER ECOMET 2" power head, both of which are commercially available from Buehler Industries, Ltd. The test was performed using the following conditions: motor speed set at 500 rpm with a constant glass/abrasive article interface pressure of either 25.5 psi (about 180 kPa) or 15 psi (about 106 kPa) over the surface area of the glass test blank.

Three flat circular glass test blanks were provided which had a 2.54 cm (1 inch) diameter and a thickness of approximately 1.0 cm, commercially available under the trade designation "CORNING #9061", commercially available from Corning Incorporated. The glass material was placed into the power head of the grinder. The 30.5 cm (12 inch) aluminum platform of the grinder rotated counter clockwise while the power head, into which the glass test blank was secured, rotated clockwise at 35 rpm.

An abrasive article was die cut to approximately a 20 cm (8 inch) diameter circle and was adhered with a pressure sensitive adhesive directly onto a urethane backing pad which had a Shore A hardness of about 90 durometer. The urethane backing pad was attached to a open cell, soft foam pad having a thickness of about 30 mm cut from a sheet of the soft foam. This pad assembly was placed on the aluminum platform of the grinder. Tap water was sprayed onto the abrasive article at a flow rate of approximately 3 liters/minute to provide lubrication between the surface of the abrasive article and the glass test blank.

The glass test blank was ground using the grinder described above. The polishing time interval of the grinder was set at 10 seconds. However, real time contact between the abrasive article and the glass test blank surface was found to be greater than the set time because the grinder did not begin timing until the abrasive article was stabilized on the glass test blank surface. That is, some bouncing or skipping of the abrasive article on the glass surface was observed and the grinder began timing at the point in time when contact between the abrasive article and the glass surface was substantially constant. Thus, real time grinding interval, that is, the contact time between the abrasive article and the glass surface was about 12 seconds when the grinding time interval was set at 10 seconds.

After the 10 second grinding, the surface finish and thickness of the glass were recorded. The glass was then ground for 3 minutes, after which the thickness was again measured. This thickness was the starting point for the next 10 second grinding test.

EXAMPLE 1

For Example 1, the TEFLON™ brand PTFE mold was filled with the abrasive slurry made according to the formulation in Table 1. Part A and Part B were prepared, heated to 80° C., and then dispensed through a mixing tip into the cavities of the mold.

The filled post cavities were then covered to a depth of approximately 6.4 mm with the backing formulation shown in Table 2 by dispensing Part A and Part B through another mixing tip. Walls surrounding the mold maintain the desired thickness for the backing. An aluminum cover plate was placed over the top of the backing resin during the cure cycle to assure constant, uniform thickness. The entire abrasive article was then cured at 165° C. for 15 hours.

After cure, the sample was removed from the mold and cut to produce a 20 cm diameter circle for testing. The grinding tests were run as described above and the results are reported in Table 3. Table 3 reports 17 grinding measurements recorded at two interface pressures, 25.5 psi (175.8 kPa) and 15 psi (1 05.5kPa), in the course of 72 minutes. Each reported measurement is the amount of glass material removed in approximately a 12 second grinding period (machine set to 10 seconds but approximately 12 seconds actual grind time, as described earlier).

Ra and Rz were measured at the end of each data point. The average of the surface finish after all 12 second measurements was Ra=1.2 micrometers, Rz=8.0 micrometers.

TABLE 1

Abrasive Slurry

| Component | Volume Mix Ratio: | Actual Batch Weight (g) | Weight Percentage |
|---|---|---|---|
| Part A | 2.00 | | |
| EPO | | 978.33 | 46.90 |
| URE | | 52.15 | 2.50 |
| CMSK | | 1032.57 | 49.50 |
| AER | | 10.43 | 0.50 |
| APS | | 10.43 | 0.50 |
| TFS | | 2.09 | 0.10 |
| Total = | | 2086.00 | 100.00 |
| Part B | 1.00 | | |
| ETH | | 258.58 | 18.47 |
| RIO | | 1.40 | 0.10 |
| CaCO3 | | 798.00 | 57.00 |
| DIA Grade 200/230 | | 301.32 | 21.52 |
| AER | | 28.00 | 2.00 |
| APS | | 11.34 | 0.81 |
| TFS | | 1.40 | 0.10 |
| Total = | | 1400.00 | 100.00 |
| Overall Total = | | 3486.00 | |

TABLE 2

Backing Formulation

| Component | Volume Mix Ratio: | Actual Batch Weight (g) | Weight Percentage |
|---|---|---|---|
| Part A | 10.00 | | |
| ADI | | 8020.00 | 100.00 |
| Total = | | 8020.00 | 100.00 |
| Part B | 1.00 | | |
| AMI | | 843.00 | 84.30 |
| CMSK | | 95.00 | 9.50 |
| RIO | | 35.00 | 3.50 |
| AER | | 17.00 | 1.70 |
| TFS | | 10.00 | 1.00 |
| Total = | | 1000.00 | 100.00 |
| Overall Total = | | 9020.00 | |

TABLE 3

Grinding Data

| Time (minutes) | Interface Pressure (psi) | Stock Removed (micrometers) |
|---|---|---|
| 0.17 | 25.5 | 185 |
| 0.33 | 25.5 | 562 |
| 2.5 | 25.5 | 552 |
| 5.17 | 25.5 | 480 |
| 8 | 25.5 | 449 |
| 11.33 | 25.5 | 449 |
| 14.66 | 25.5 | 430 |
| 18 | 25.5 | 437 |
| 21.33 | 25.5 | 418 |
| 24.67 | 25.5 | 444 |
| 28.17 | 25.5 | 432 |
| 31.5 | 25.5 | 425 |
| 37.67 | 15 | 211 |
| 45.83 | 15 | 197 |
| 54.5 | 15 | 192 |
| 63.67 | 15 | 209 |
| 72 | 15 | 168 |

EXAMPLE 2

Example 2 was prepared as described in Example 1 except that the abrasive slurry formulation is given in Table 4 and the backing formulation is given in Table 5. Example 2 was tested as described above and the results are reported in Table 6. Table 6 reports 14 grinding measurements recorded at two interface pressures, 25.5 psi (175.8 Pa) and 15 psi (105.5 kPa), in the course of 117 minutes. Each reported measurement is the amount of glass material removed in approximately a 12 second grinding period (machine set to 10 seconds but approximately 12 seconds actual grind time, as described earlier).

Ra and Rz were measured at the end of each data point. The average of the surface finish after all 12 second measurements was Ra=0.8 micrometers, Rz=5.8 micrometers.

TABLE 4

Abrasive Slurry

| Component | Volume Mix Ratio: | Actual Batch Weight (g) | Weight Percentage |
|---|---|---|---|
| Part A | 2.00 | | |
| EPO | | 978.33 | 46.90 |
| URE | | 52.15 | 2.50 |
| CMSK | | 1032.57 | 49.50 |
| CaCO3 | | 0.00 | 0.00 |
| AER | | 10.43 | 0.50 |
| APS | | 10.43 | 0.50 |
| TFS | | 2.09 | 0.10 |
| Total = | | 2086.00 | 100.00 |
| Part B | 1.00 | | |
| ETH | | 258.58 | 18.47 |
| RIO | | 1.40 | 0.10 |
| CaCO3 | | 798.00 | 57.00 |
| DIA Grade 270/325 | | 301.32 | 21.52 |
| AER | | 28.00 | 2.00 |
| APS | | 11.34 | 0.81 |
| TFS | | 1.40 | 0.10 |
| Total = | | 1400.00 | 100.00 |
| Overall Total = | | 3486.00 | |

TABLE 5

Backing Formulation

| Component | Volume Mix Ratio | Actual Batch Weight (g) | Weight Percentage |
|---|---|---|---|
| Part A | 10.00 | | |
| ADI | | 8020.00 | 100.00 |
| Total = | | 8020.00 | 100.00 |
| Part B | 1.00 | | |
| AMI | | 843.00 | 84.30 |
| CMSK | | 95.00 | 9.50 |
| RIO | | 35.00 | 3.50 |
| AER | | 17.00 | 1.70 |
| TFS | | 10.00 | 1.00 |
| Total = | | 1000.00 | 100.00 |
| Overall Total = | | 9020.00 | |

TABLE 6

Grinding Data

| Time (minutes) | Interface Pressure (psi)(kPa) | Stock Removed (micrometers) |
|---|---|---|
| 0.67 | 25.5 (175.8) | 430 |
| 4.33 | 25.5 (175.8) | 348 |
| 9 | 25.5 (175.8) | 317 |
| 14.16 | 25.5 (175.8) | 283 |
| 19.83 | 25.5 (175.8) | 252 |
| 25 | 25.5 (175.8) | 244 |
| 31 | 25.5 (175.8) | 250 |
| 36.5 | 25.5 (175.8) | 235 |
| 44.17 | 25.5 (175.8) | 214 |
| 51.83 | 25.5 (175.8) | 214 |
| 64 | 15 (105.5) | 103 |
| 79.67 | 15 (105.5) | 86 |
| 98.83 | 15 (105.5) | 72 |
| 117 | 15 (105.5) | 91 |

The Preparation Procedure Of The Diamond Agglomerate Samples.

The ingredients of each diamond agglomerate sample are listed in Table 7 below.

TABLE 7

Diamond Agglomerate Samples 1–4

| Component | Batch Weight Of Agglomerate Sample 1 (g) | Batch Weight Of Agglomerate Sample 2 (g) | Batch Weight Of Agglomerate Sample 3 (g) | Batch Weight Of Agglomerate Sample 4 (g) |
|---|---|---|---|---|
| BD | 30.00 | 30.00 | 30.00 | 30.00 |
| Water | 8.60 | 8.60 | 8.60 | 8.60 |
| GP | 20.00 | 20.00 | 20.00 | 20.00 |
| RNH DIA (40 μm) | — | — | — | 20.00 |
| RNH DIA (30 μm) | — | 20.00 | — | — |
| RNH DIA (20 μm) | 20.00 | — | — | — |
| RNH DIA (15 μm) | — | — | 20 | — |
| Total = | 78.60 | 78.60 | 78.60 | 78.60 |
| Agglomerate Size | 225 μm | 225 μm | 225 μm | 225 μm |

All the ingredients of each agglomerate sample were combined and mixed in a plastic beaker by hand with a spatula to form a diamond dispersion. The diamond dispersion was then coated into a 9 mil, random pattern plastic tool having gumdrop-shaped cavities, using a flexible plastic spatula to form the agglomerates. The method of making the plastic tool is described in U.S. Pat. No. 5,152,917. The molded agglomerate samples were dried in the mold at room temperature overnight. The molded agglomerate samples were removed from the mold using an ultrasonic horn. The agglomerate samples were then screened using a 70 mesh screen to separate them from each other. After separation, the size of the agglomerates ranged from about 175 to about 250 micrometers.

The Butvar dispersion is the temporary binder, commercially available from Monsanto, Springfield, Mass. The GP (glass powder "SP1016") is the permanent binder, commercially available from Specialty Glass, Inc. Alternative temporary binders are dextrin, epoxy resin, acrylate resin, and the like as well as other temporary binders commonly used in ceramic industry.

The screened agglomerate samples were placed in an alumina sagger and fired in air through the following cycle:

Room temperature to 400° C. at 2.0° C./minute;

Hold at 400° C. for 1 hour;

400° C. to 720° C. at 2.0° C./minute;

Hold at 720° C. for 1 hour; and

720° C. to room temperature at 2.0° C./minute.

The agglomerates were then screened using a 70 mesh screen as described above.

The fired agglomerate samples were then treated with a silane solution so to provide the agglomerates with better adhesion to the epoxy resin system. The silane solution is made by mixing the following ingredients:

| | |
|---|---|
| A-1100 Silane | 1.0 g |
| Water | 10.0 g |
| Acetone | 89.0 g |

The agglomerate samples were wetted with the silane solution and the excess was poured off.

The silane solution-treated agglomerate samples were then placed in a 90° C. oven and dried for 30 minutes. The dried agglomerate samples were then screened as described above using a 70 mesh screen.

B. Preparation Procedure Of The Molded Abrasive Article Examples 3–6 and Comparative Examples A–D.

For Examples 3–6 and Comparative Examples A–D, the PTFE mold of Example 1 was filled with the abrasive slurry made according to the formulations Table 8. Part A and Part B were mixed separately in plastic beakers with a high shear mixer, placed separately in a vacuum oven to remove air bubbles, then filled together in to a 2:1 volume ratio mixing cartridges, 2 parts A to 1 part B. Then the resultant abrasive slurry was dispensed through an automatic mixing tip into the cavities of the mold.

TABLE 8

Abrasive Slurries

| Component | Batch Weight Of Comparative Example A (g) | Batch Weight Of Comparative Example B (g) | Batch Weight Of Comparative Example C (g) | Batch Weight Of Comparative Example D (g) | Batch Weight Of Example 3 (g) | Batch Weight Of Example 4 (g) | Batch Weight Of Example 5 (g) | Batch Weight Of Example 6 (g) |
|---|---|---|---|---|---|---|---|---|
| Part A | | | | | | | | |
| EPO | 70.35 | 70.35 | 71.76 | 73.87 | 74.57 | 74.57 | 74.57 | 74.57 |
| URE | 3.75 | 3.75 | 3.83 | 3.94 | 3.98 | 3.98 | 3.98 | 3.98 |
| CMSK | 74.25 | 74.25 | 75.74 | 77.96 | 78.71 | 78.71 | 78.71 | 78.71 |
| AER | 0.75 | 0.75 | 0.77 | 0.79 | 0.80 | 0.80 | 0.80 | 0.80 |
| APS | 0.75 | 0.75 | 0.77 | 0.79 | 0.80 | 0.80 | 0.80 | 0.80 |
| TFS | 0.15 | 0.15 | 0.15 | 0.16 | 0.16 | 0.16 | 0.16 | 0.16 |
| Part A Total = | 150.00 | 150.00 | 153.00 | 157.50 | 159.00 | 159.00 | 159.00 | 159.00 |
| Part B | | | | | | | | |
| ETH | 18.47 | 18.47 | 17.80 | 18.49 | 18.49 | 18.49 | 18.49 | 18.49 |
| RIO | 0.10 | 0.10 | 0.10 | 0.10 | 0.10 | 0.10 | 0.10 | 0.10 |
| CMSK | 27.77 | 27.77 | 27.89 | 28.00 | 28.00 | 28.00 | 28.00 | 28.00 |
| CaCO3 | 34.50 | 34.50 | 43.00 | 43.00 | 43.00 | 43.00 | 43.00 | 43.00 |
| DIA | 7.15 | 7.15 | 3.65 | 7.50 | 3.75 | 3.75 | 3.75 | 3.75 |
| Nickel on DIA | 9.10 | 9.10 | 4.65 | — | — | — | — | — |
| Glass on DIA | — | — | — | — | 3.75 | 3.75 | 3.75 | 3.75 |
| AER | 2.00 | 2.00 | 2.00 | 2.00 | 2.00 | 2.00 | 2.00 | 2.00 |
| APS | 0.81 | 0.81 | 0.81 | 0.81 | 0.81 | 0.81 | 0.81 | 0.81 |
| TFS | 0.10 | 0.10 | 0.10 | 0.10 | 0.10 | 0.10 | 0.10 | 0.10 |
| Part B Total = | 100.00 | 100.00 | 100.00 | 100.00 | 100.00 | 100.00 | 100.00 | 100.00 |
| Overall Total = | 250.00 | 250.00 | 253.00 | 257.50 | 259.00 | 259.00 | 259.00 | 259.00 |
| Diamond Type | GE, RVG-W particles | GE, RVG-W Particle | GE, RVG-W Particle | 3M, RNH Particle | Agglomerate Sample 1 | Agglomerate Sample 2 | Agglomerate Sample 3 | Agglomerate sample 4 |
| Diamond Size | 65 um (Grade 230/270) | 45 um (Grade 325/400) | 65 um (Grade 230/270) | 40 um | 20 um | 30 um | 15 um | 40 um |
| Volume % Diamond | 1.5 | 1.5 | 0.75 | 1.5 | 0.74 | 0.74 | 0.74 | 0.74 |

The filled post cavities were then covered to a depth of approximately 6.4 mm (¼ inch) with the backing formulation of Example 1 shown in Table 3 by dispensing the formulation through an auto-mix tip. Walls surrounding the mold maintained the desired thickness for the backing. An aluminum cover plate was placed over the top of the backing resin during the cure cycle to assure constant, uniform thickness. The mold was clamped closed and allowed to cure at room temperature for one to two hours and then in an oven for 4 hours at 165° C. The mold was removed from the oven and opened. The molded abrasive samples were taken from mold and mounted on a 30.48 cm (12 inches) platen for a Buehler lap.

The backing formulations were prepared by first mixing the components of Part B, according to Table 9, in a plastic beaker with a high shear mixer, removing air bubbles by placing the samples in a vacuum oven, and then by mixing Part A with Part B with a low shear mixer, so to minimize bubble entrapment.

The molded abrasive samples had a backing of 30.48 cm (12 inches) in diameter and abrasive posts of 1.59 cm (⅝ inch) in diameter. The abrasive posts were bonded to backing such that the circular area that covers the center (15.24 cm (6 inches)) has no abrasive posts.

TABLE 9

The Resin Formulations Of The Backings Of Molded Abrasive Article Examples

| Component | Batch Weight Of Comparative Example A (g) | Batch Weight Of Comparative Example B (g) | Batch Weight Of Comparative Example C (g) | Batch Weight Of Comparative Example D (g) | Batch Weigth Of Example 3 (g) | Batch Weight Of Example 4 (g) | Batch Weight Of Example 5 (g) | Batch Weight Of Example 6 (g) |
|---|---|---|---|---|---|---|---|---|
| Part A | | | | | | | | |
| ADI | 783.64 | 783.64 | 783.64 | 783.64 | 783.64 | 783.64 | 783.64 | 783.64 |
| Part B | | | | | | | | |
| AMI | 80.85 | 80.85 | 80.85 | 80.85 | 80.85 | 80.85 | 80.85 | 80.85 |
| CMSK | 12.95 | 12.95 | 12.95 | 12.95 | 12.95 | 12.95 | 12.95 | 12.95 |

TABLE 9-continued

The Resin Formulations Of The Backings Of Molded Abrasive Article Examples

| Component | Batch Weight Of Comparative Example A (g) | Batch Weight Of Comparative Example B (g) | Batch Weight Of Comparative Example C (g) | Batch Weight Of Comparative Example D (g) | Batch Weigth Of Example 3 (g) | Batch Weight Of Example 4 (g) | Batch Weight Of Example 5 (g) | Batch Weight Of Example 6 (g) |
|---|---|---|---|---|---|---|---|---|
| Red Iron Oxide | 3.50 | 3.50 | 3.50 | 3.50 | 3.50 | 3.50 | 3.50 | 3.50 |
| AER | 1.70 | 1.70 | 1.70 | 1.70 | 1.70 | 1.70 | 1.70 | 1.70 |
| 7 TFS | 1.00 | 1.00 | 1.00 | 1.00 | 1.00 | 1.00 | 1.00 | 1.00 |
| Total = | 100.00 | 100.00 | 100.00 | 100.00 | 100.00 | 100.00 | 100.00 | 100.00 |

Test Procedure

The test procedure utilized a "Buehler Ecomet 4" variable speed grinder on which was mounted a "Buehler Ecomet 2" power head, both of which are commercially available from Buehler Industries, Ltd. The test was performed using the following conditions: motor speed set at 500 rpm, unless it is stated otherwise, with a pressure of about 106 kPa (about 17 psi), unless it is stated otherwise, over the surface area of the glass test blank.

Three flat circular glass test blanks were provided which had a 2.54 cm (1 inch) diameter and a thickness of approximately 1.0 cm, commercially available under the trade designation "CORNING #9061", commercially available from Corning Incorporated. The glass material was placed into the power head of the grinder. The 30.5 cm (12 inch) aluminum platform of the grinder rotated counter clockwise while the power head, into which the glass test blank was secured, rotated clockwise at 35 rpm.

A molded abrasive article was die cut to approximately a 30.45 cm (12 inches) diameter circle and was adhered with a pressure sensitive adhesive directly onto a 12.5 mm thick neoprene backing pad which had a Shore A hardness of about 60 durometer. This pad assembly was placed on the aluminum platform of the grinder. Tap water was sprayed onto the abrasive article at a flow rate of approximately 3 liters/minute to provide lubrication between the surface of the abrasive article and the glass test blank.

An initial surface finish on the glass test blank was evaluated with a diamond stylus profilometer, commercially available under the trade designation "PERTHOMETER", commercially available from Perthen. An initial weight of the glass test blank was also recorded The glass test blank was ground using the grinder described above. The polishing time was from 12 seconds to several minutes. All data was normalized and reported as average glass stock removed in 12 seconds of polishing.

After grinding, final surface finish and a final weight were each recorded. The change in weight of the glass test blank over the grinding time is shown as grams of glass stock removed. The cut rate (glass stock in grams removed), Ra, and Rmax values were recorded.

The grinding test results of Example 3 are shown in Table 10 below. The data show that abrasive articles of the invention containing diamond agglomerates provide consistent stock removal rate at pressures as low as 26.5 kPa.

TABLE 10

The Grinding Data And Grinding Condition Of Example 3

| Time (minutes) | Stock Removal (micrometers/12 sec) | Pressure (kPa) |
|---|---|---|
| 1 | 76 | 106 |
| 4 | 78 | 106 |
| 7 | 81 | 106 |
| 16 | 81 | 106 |
| 26 | 79 | 106 |
| 31 | 78 | 106 |
| 46 | 77 | 106 |
| 61 | 76 | 106 |
| 91 | 78 | 106 |
| 121 | 81 | 106 |
| 136 | 62 | 53 |
| 151 | 64 | 53 |
| 181 | 66 | 53 |
| 201 | 67 | 53 |
| 251 | 63 | 53 |
| 367 | 14 | 26.5 |
| 372 | 10 | 26.5 |
| 377 | 9 | 26.5 |
| 382 | 11 | 26.5 |
| 397 | 9 | 26.5 |
| 412 | 10 | 26.5 |

The grinding test data of Example 6 and Comparative Example D are listed in Table 11. The data show that stock removal rate of the Example 6 abrasive article containing diamond agglomerates is significantly higher than stock removal rate of Comparative Example D with individual diamond particles of the same size.

TABLE 11

The Grinding Data Of Comparative Example D And Example 6

| Time (minute) | Stock Removal (micrometers removed/12 sec) | |
|---|---|---|
| | Comparative Example D | Example 6 |
| 24 | 33 | |
| 34 | 32 | |
| 44 | 28 | |
| 54 | 22.5 | |
| 64 | 18.5 | |
| 65 | | 119 |
| 74 | 17.8 | |
| 75 | | 111 |
| 78 | | 101 |
| 84 | 15.2 | |
| 88 | | 100 |
| 104 | 12.8 | |
| 107 | | 110 |

TABLE 11-continued

The Grinding Data Of Comparative Example D And Example 6

| Time (minute) | Stock Removal (micrometers removed/12 sec) | |
|---|---|---|
| | Comparative Example D | Example 6 |
| 112 | | 107 |
| 124 | 10.5 | |
| 126 | | 105 |
| 144 | 9.5 | |

The grinding test data of Comparative Example C and Example 4 are listed in Table 12. The data show that the stock removal rate of Example 4 containing diamond agglomerates is significantly higher than the stock removal rate of Comparative Example C with individual diamond particles of larger size.

TABLE 12

The Grinding Data Of Comparative Example C And Example 4

| Time (minutes) | Stock Removal (micrometers removed/12 sec) | |
|---|---|---|
| | Comparative Example C | Example 4 |
| 117 | 52 | |
| 127 | 45 | |
| 137 | 41 | |
| 145 | | 81 |
| 147 | 39 | |
| 150 | | 79 |
| 157 | 36 | |
| 160 | | 81 |
| 165 | | 79 |
| 167 | 34 | |
| 177 | 33 | |
| 320 | | 68 |
| 410 | | 64 |
| 425 | | 70 |
| 435 | | 73 |
| 450 | | 77 |

The surface smoothness data (Ra and Rmax) of Comparative Example B and Example 5 are listed in Table 13 and Table 14 below. These data show three advantages of this invention. Firstly, the Ra data show that the surface finish provided by Example 5 with diamond agglomerates is finer than that of Comparative Example B with individual diamond particles with similar stock removal rates. Secondly, the Ra and Rmax data demonstrate the surface finish is improved at higher relative speed for Example 5 with diamond agglomerates whereas it does not improve for Comparative Example B with individual diamond particles. Finally, the Rmax data show that scratch depth is smaller with Example 5 with diamond agglomerates than that of Comparative Example B with individual diamond particles with similar stock removal rates.

TABLE 13

The Surface Smoothness Data In Ra Of Comparative Example B And Example 5

| Speed (RPM) | Surface Smoothness in Ra (micrometers) | |
|---|---|---|
| | Comparative Example B | Example 5 |
| 100 | 0.68 | 0.61 |
| 200 | 0.68 | 0.5 |
| 300 | 0.71 | 0.46 |
| 400 | 0.62 | 0.42 |
| 500 | | 0.38 |

TABLE 14

The Surface Smoothness Data In Rmax Of Comparative Example B And Example 5

| Speed (RPM) | Surface Smoothness in Rmax (micrometers) | |
|---|---|---|
| | Comparative Example B | Example 5 |
| 100 | 5.9 | 5.38 |
| 200 | 5.93 | 4.79 |
| 300 | 6.93 | 4.9 |
| 400 | 5.98 | 4.1 |
| 500 | | 3.9 |

The surface smoothness data (Ra and Rmax) of Comparative Example A and Example 4 are listed in Table 15 and Table 16 below. These data show three advantages of this invention. Firstly, the Ra data show that the surface finish provided by Example 4 with diamond agglomerates is finer than that of Comparative Example A with individual diamond particles with similar stock removal rates. Secondly, the Ra and Rmax data demonstrate that surface finish is improved at higher relative speed for Example 4 with diamond agglomerates whereas it does not improve for Comparative Example A with individual diamond particles. Finally, the Rmax data show that scratch depth is smaller with Example 4 with diamond agglomerates than that of Comparative Example A with individual diamond particles with similar stock removal rates.

TABLE 15

The Surface Smoothness Data In Ra Of Comparative Example A And Example 4

| Speed (RPM) | Surface Smoothness in Ra (micrometers) | |
|---|---|---|
| | Comparative Example A | Example 4 |
| 100 | 0.86 | 0.8 |
| 200 | 0.86 | 0.69 |
| 300 | 0.85 | 0.62 |
| 400 | 0.8 | 0.62 |
| 500 | | 0.54 |

TABLE 16

The Surface Smoothness Data In Rmax Of Comparative Example A And Example 4

| Speed (RPM) | Surface Smoothness in Rmax (micrometers) | |
|---|---|---|
| | Comparative Example A | Example 4 |
| 100 | 7.61 | 7.49 |
| 200 | 7.54 | 7.17 |

TABLE 16-continued

The Surface Smoothness Data In Rmax Of Comparative Example A And Example 4

| | Surface Smoothness in Rmax (micrometers) | |
|---|---|---|
| Speed (RPM) | Comparative Example A | Example 4 |
| 300 | 7.66 | 5.64 |
| 400 | 7.21 | 5.43 |
| 500 | | 5.14 |

Testing Procedure III For The Molded Abrasive Article Examples 7–11

A small area (about 17.78 cm×17.78 cm) of a CRT screen was first roughened with a 5 micron aluminum oxide disc (268XA Trizac™ film PSA discs, A5MIC, commercially available from Minnesota Mining and Manufacturing Company, St. Paul, Minn.) using a hand held sander (commercially available from Flex, model LW 603VR, 1,000–2,800 rpm, 1,500W). The sander was operated at 2,400 rpm and water was supplied through a hole in the middle of the sander. A polishing pad (12.7 cm in diameter) with a plurality of posts (0.79 cm in diameter and 0.635 cm in height) was mounted onto the disc pad of the sander. The pre-roughened area of the CRT screen was polished for 30 seconds at 2,400 rpm. The breakdown of the post was determined visually by the amount of loose ceria slurry produced during polishing. The rating of the breakdown test is from 1 to 5 with 1 having little breakdown and 5 having excessive breakdown. The optimum rating is 3 with a moderate breakdown. Excessive breakdown of the abrasive posts provides good polishing performance but shortens the life of the polishing pad. Insufficient breakdown of the abrasive posts gives a long life but provides poor polishing performance.

Adhesion of the posts to the backing is very important. If the post to backing adhesion is weak, the posts may detach from the backing during polishing when the friction between the CRT screen and the posts is greater than the adhesion force between the post and the backing. The results of the adhesion test are determined by measuring the percentage of posts detached from the backing after polishing (as described above).

Preparation Procedure Of The Molded Abrasive Article Examples 7–11

A production tool was made by drilling a pattern of tapered holes into a 25.0 mm thick sheet of TEFLON™ brand polytetrafluoroethylene (PTFE). The resulting polymeric production tool contained cavities that were in the shape of cylindrical posts. The height of each post was about 4 mm and the diameter was about 4.8 mm. There were approximately 2.4 mm between the bases of adjacent posts.

For Examples 7–11, the mold of was filled with the abrasive slurry made according to the formulations in Table 17. The ingredients were mixed in a plastic beaker with a high shear mixer, placed in a vacuum oven to remove air bubbles, then filled in to a cartridge. Then the resultant abrasive slurry was dispensed through an automatic mixing tip into the cavities of the mold.

The filled post cavities were then covered to a depth of approximately 6.4 mm (¼ inch) with the respective backing formulations in Table 18 by dispensing the formulation through an auto-mix tip. Walls surrounding the mold maintained the desired thickness for the backing. An aluminum cover plate was placed over the top of the backing resin during the cure cycle to assure constant, uniform thickness. The mold was clamped closed and allowed to cure at room temperature for one to two hours, and then in an oven for 4 hours at 165° C. The mold was removed from the oven and opened.

The backing formulations were prepared by first mixing the components of Part B, according to Table 18, in a plastic beaker with a high shear mixer, removing air bubbles by placing the samples in a vacuum oven, and then by mixing Part A with Part B with a low shear mixer, so to minimize bubble entrapment.

The molded abrasive samples had a backing of 12.7 cm (5 inches) in diameter and abrasive posts of 0.79 cm (5/16 inch) in diameter.

TABLE 17

Formulations of the Abrasive Posts of Examples 7–11

| Ingredients | Example 7 | Example 8 | Example 9 | Example 10 | Example 11 |
|---|---|---|---|---|---|
| EPO | 9.58 | 9.42 | 9.35 | 9.35 | 9.33 |
| ETH | 2.30 | 2.26 | 2.25 | 2.25 | 2.24 |
| SR339 | 2.10 | 2.08 | 2.06 | 2.06 | 2.06 |
| APS | 1.24 | 1.30 | 1.29 | 1.29 | 1.29 |
| VAZO | 0.05 | 0.05 | 0.05 | 0.05 | 0.05 |
| CERIA | 79.99 | 78.64 | 78.04 | 78.04 | 77.92 |
| K-16 | 0.0 | 6.11 | 6.06 | 6.06 | 3.03 |
| K-SS | 4.66 | 0.00 | 0.00 | 0.00 | 3.03 |
| KBF4 | 0.00 | 0.00 | 0.76 | 0.76 | 0.76 |
| TFS | 0.08 | 0.15 | 0.15 | 0.15 | 0.30 |
| Total | 100.00 | 100.00 | 100.00 | 100.00 | 100.00 |

TABLE 18

Backing Formulations of Examples 7–11

| Ingredients | Example 7 | Example 8 | Example 9 | Example 10 | Example 11 |
|---|---|---|---|---|---|
| Part A | | | | | |
| ADI | 50.00 | 50.00 | 50.00 | 81.33 | 81.2 |
| W-G | 0.00 | 0.00 | 0.00 | 6.55 | 6.54 |
| TFS | 0.00 | 0.00 | 0.00 | 0.00 | 0.16 |
| Part B | | | | | |
| AMI | 42.15 | 42.15 | 42.15 | 8.39 | 8.37 |
| CMSK | 4.75 | 4.75 | 4.75 | 0.00 | 0.00 |
| RIO | 1.75 | 1.75 | 1.75 | 0.36 | 0.36 |
| AER | 0.85 | 0.85 | 0.85 | 0.00 | 0.00 |
| TFS | 0.50 | 0.50 | 0.50 | 0.09 | 0.09 |
| W-G | 0.00 | 0.00 | 0.00 | 3.28 | 3.27 |
| Total | 100.00 | 100.00 | 100.00 | 100.00 | 100.00 |

The Tesults of the Adhesion Test are shown in Table 19.

TABLE 19

The Breakdown And Adhesion Test Results Of Examples 7–11

| Test | Example 7 | Example 8 | Example 9 | Example 10 | Example 11 |
|---|---|---|---|---|---|
| Breakdown | 2 | 3 | 4 | 4 | 3 |
| Adhesion (% of post detached) | 0 | 6 | 5 | 0.7 | 0 |

Preparation Procedure Of The Molded Abrasive Article Examples 12–14

For Examples 12–14, the PTFE mold of Examples 7–11 was filled with the abrasive slurry made according to the formulations in Table 20. The ingredients were mixed in a plastic beaker with a high shear mixer, placed in a vacuum oven to remove air bubbles, then filled in to a cartridge. Then the resultant abrasive slurry was dispensed through an automatic mixing tip into the cavities of the mold.

The filled post cavities were then covered to a depth of approximately 4.0 mm with the backing formulation in Table 21 by dispensing the formulation through an auto-mix tip. The backing formulation was prepared by mixing the components of Part A and B in a plastic beaker with a high shear mixer, and removing air bubbles by placing the samples in a vacuum oven so to minimize bubble entrapment. Walls surrounding the mold maintained the desired thickness for the backing. An aluminum cover plate was placed over the top of the backing resin during the cure cycle to assure constant, uniform thickness. The mold was clamped closed and allowed to cure at room temperature for one to two hours, and then in an oven for 4 hours at 165° C. The mold was removed from the oven and opened.

The molded abrasive samples had a backing of 20.3 cm (8 inches) in diameter and of 4 mm in thickness, and abrasive posts of 4.8 mm (3/16 inch) in diameter and 4.0 mm in height.

TABLE 20

The Formulations of the Abrasive Posts of Examples 12–14

| Ingredients | Example 12 | Example 13 | Example 14 |
|---|---|---|---|
| EPO | 10.18 | 10.01 | 9.81 |
| ETH | 2.45 | 2.41 | 2.36 |
| SR339 | 2.24 | 2.21 | 2.16 |
| APS | 1.40 | 1.38 | 1.35 |
| VAZO | 0.05 | 0.05 | 0.05 |
| CERIA | 75.92 | 74.69 | 73.14 |
| K-16 | 3.30 | 3.25 | 3.18 |
| K-SS | 3.30 | 3.25 | 3.18 |
| KBF4 | 0.83 | 0.81 | 0.80 |
| Graphite | 0 | 1.62 | 0 |
| Moly | 0 | 0 | 3.66 |
| TFS | 0.33 | 0.32 | 0.32 |
| Total | 100.00 | 100.00 | 100.00 |

TABLE 21

The Backing Formulation of Examples 12–14

| Ingredients | Examples 11–14 |
|---|---|
| Part A | |
| ADI | 82.89 |
| W-G | 6.68 |
| TFS | 0.5 |
| APS | 0.16 |
| TiO2 | 0.67 |
| Moly | 0.56 |
| Part B | |
| AMI | 8.55 |
| Total | 100.00 |

Test Procedure for Examples 12–14

The test procedure utilized a Buehler ECOMET 3 polisher, commercially available from Buehler Industries, Ltd. Examples 12–14 were conditioned in the Buehler machine at 8.49 psi (58.5 KPa) and 500 rpm platen speed with a sand-blasted 3 inch (7.62 cm) disc from regular window glass to generate an uniform and flat surface finish.

A 2 inch (5.08 cm) CRT glass disc (commercially available from Philips) was pre-roughened with an 8 inch (20.32 cm) A10 grade glass repair disk (commercially available from Minnesota Mining and Manufacturing Company, under the trade name 3M 268XA Trizact), on the Buehler machine for about 30 seconds at about 1.23 psi (8.48 KPa) and 500 rpm. This generated an uniform input finish of Ra about 0.07 um.

Then the pre-roughened CRT glass disc was used to test an example on the Buehler machine at 19.1 psi (131.7 KPa) and 500 rpm platen speed. The water flow was fixed at 660 cc/minute. Measurements of the surface finish were made at every 15-second interval and repeated up to 45 seconds by a diamond stylus profilometer, commercially available under the trade designation Perthometer from Perthen.

The surface finish data of examples 12–14 are summarized in Table 22. The data show that Example 13 and Example 14 with graphite and molybdenum disulfide respectively reduce the surface roughness from ~0.070 um to ~0.009 um in 15 seconds whereas it takes the control (Example 12 without graphite or molybdenum disulfide) 45 seconds to do so.

TABLE 22

The Surface Finish data (um in Ra) of Examples 12–14

| Polishing time, sec | Example 12 | Example 13 | Example 14 |
|---|---|---|---|
| 0 | 0.070 | 0.0700 | 0.0683 |
| 15 | 0.018 | 0.0086 | 0.0093 |
| 30 | 0.012 | 0.0085 | 0.0040 |
| 45 | 0.009 | 0.0085 | 0.0056 |

The complete disclosures of all patents, patent applications, and publications are incorporated herein by reference as if individually incorporated. Various modifications and alterations of this invention will become apparent to those skilled in the art without departing from the scope and spirit of this invention, and it should be understood that this invention is not to be unduly limited to the illustrative embodiments set forth herein.

What is claimed is:

1. An abrasive article for grinding glass, the article comprising:
   a plurality of abrasive composites integrally molded to a backing, said composites comprising an organic resin, a metal salt selected from alkali metal salts, alkaline metal salts and combinations thereof, and single diamond abrasive particles dispersed homogeneously throughout said abrasive composites.

2. The abrasive article of claim 1 wherein the alkali metal salt is an alkali metal silicate.

3. An abrasive article for polishing glass, the article comprising:
   a backing comprising fibers; and
   a plurality of abrasive composites integrally molded to the backing, said abrasive composites comprising an organic resin, ceria particles, and a metal salt selected from alkali metal salts, alkaline metal salts and combinations thereof.

4. The abrasive article of claim 1 wherein the diamond particles are present in the composites in an amount of about 1 to 30 parts by weight and the binder is present in an amount of about 70 to 99 parts by weight.

5. The abrasive article of claim 1 wherein the alkali metal salt is hydrous potassium silicate, anhydrous potassium silicate, or a combination thereof.

6. The abrasive article of claim 3 wherein the ceria particles are present in the composites in an amount of about 1 to 95 parts by weight and the binder is present in an amount of about 5 to 99 parts by weight.

7. The abrasive article of claim 1 wherein the diamond abrasive particles have an average particles size between about 0.01 and 500 micrometers.

8. The abrasive article of claim 1 wherein the abrasive agglomerate particles are a metal bonded abrasive segment comprising diamond particles.

9. The abrasive article of claim 3 wherein the alkali metal salt is hydrous potassium silicate, anhydrous potassium silicate, or a combination thereof.

10. The abrasive article of claim 1 wherein the organic resin comprises epoxy resin.

11. The abrasive article of claim 3 wherein the alkali metal salt is an alkali metal silicate.

12. The abrasive article of claim 3 wherein the organic resin comprises epoxy resin.

13. The abrasive article of claim 1 wherein the backing comprises urethane resin.

14. The abrasive article of claim 3 wherein the backing comprises urethane resin.

15. The abrasive article of claim 3 wherein the fibers are silicate fibers, metal fibers, glass fibers, carbon fibers, ceramic fibers, high modulus organic fibers, or a combination thereof.

16. The abrasive article of claim 15 wherein the silicate fibers comprise calcium silicate.

17. The abrasive article of claim 16 wherein the abrasive composites further comprise potassium tetrafluoroborate, graphite, molybdenum disulfide, or any combination thereof.

18. The abrasive article of claim 1 wherein the composites further comprise a metal salt selected from an alkali metal salt, an alkaline metal salt, or a combination thereof.

19. The abrasive article of claim 18 wherein the alkali metal salt is an alkali metal silicate.

20. The abrasive article of claim 18 wherein the alkali metal salt is hydrous potassium silicate, anhydrous potassium silicate, or a combination thereof.

* * * * *

UNITED STATES PATENT AND TRADEMARK OFFICE
CERTIFICATE OF CORRECTION

| | | |
|---|---|---|
| PATENT NO. | : 6,354,929 B1 | Page 1 of 1 |
| DATED | : March 12, 2002 | |
| INVENTOR(S) | : Adefris, Negus B. | |

It is certified that error appears in the above-identified patent and that said Letters Patent is hereby corrected as shown below:

<u>Title page,</u>
Item [56], U.S. PATENT DOCUMENTS,
Delete "Butzke et al." and insert in place thereof -- Wolff et al. --;
Please add -- 4,255,164 A    3/1981    Butzke et al. --;

OTHER PUBLICATIONS, "Odinki" should read -- Osinski --;

<u>Column 5,</u>
Line 58, delete the word "comers" and insert in place thereof -- corners --;

<u>Column 10,</u>
Line 54, delete the word "reins" and insert in place thereof -- resins --;

<u>Column 13,</u>
Line 11, delete the word "TV" and insert in place thereof -- UV --;

<u>Column 14,</u>
Line 1, delete the word "squarelgram" and insert in place thereof -- square/gram --;
Line 33, delete the word "fight" and insert in place thereof -- light --;

<u>Column 27,</u>
Line 53, insert -- . -- after the word "recorded" and before the word "The";

<u>Column 31,</u>
Line 19, delete the word "Trizac™" and insert in place thereof -- Trizact™ --;

<u>Column 32,</u>
Line 55, delete the word "Tesults" and insert in place thereof -- results --.

Signed and Sealed this

Third Day of June, 2003

JAMES E. ROGAN
*Director of the United States Patent and Trademark Office*